(12) United States Patent
Mercat et al.

(10) Patent No.: US 12,384,488 B2
(45) Date of Patent: Aug. 12, 2025

(54) FORCE MEASUREMENT SENSOR FOR A CRANKSET

(71) Applicant: MAVIC GROUP, Chavanod (FR)

(72) Inventors: Jean-Pierre Mercat, Chavanod (FR); Bérenger Alexandre, Pringy (FR)

(73) Assignee: MAVIC GROUP, Chavanod (FR)

( * ) Notice: Subject to any disclaimer, the term of this patent is extended or adjusted under 35 U.S.C. 154(b) by 969 days.

(21) Appl. No.: 17/604,003

(22) PCT Filed: Apr. 15, 2020

(86) PCT No.: PCT/FR2020/000122
§ 371 (c)(1),
(2) Date: Oct. 15, 2021

(87) PCT Pub. No.: WO2020/212659
PCT Pub. Date: Oct. 22, 2020

(65) Prior Publication Data
US 2022/0219779 A1    Jul. 14, 2022

(30) Foreign Application Priority Data
Apr. 17, 2019  (FR) ...................................... 1904132

(51) Int. Cl.
*B62M 6/50*       (2010.01)
*B62J 45/411*   (2020.01)
(Continued)

(52) U.S. Cl.
CPC .............. *B62M 6/50* (2013.01); *B62J 45/411* (2020.02); *B62J 45/421* (2020.02); *B62M 3/003* (2013.01)

(58) Field of Classification Search
CPC ........ B62M 6/50; B62M 3/003; B62J 45/411; B62J 45/421
See application file for complete search history.

(56) References Cited

U.S. PATENT DOCUMENTS 6,418,797 B1 *   7/2002   Ambrosina .............. B62M 6/45
                                                                   73/862.29
8,746,081 B2 *   6/2014   Sasaki .................... B62J 45/421
                                                                   73/862.045
(Continued)

FOREIGN PATENT DOCUMENTS

DE    10 2010 018 658 A1    12/2010
WO    WO 2011/074947 A1     6/2011
(Continued)

OTHER PUBLICATIONS

WO-2013042319-A1, English Translation (Year: 2013).*
(Continued)

*Primary Examiner* — Ryan D Walsh
(74) *Attorney, Agent, or Firm* — Oblon, McClelland, Maier & Neustadt, L.L.P.

(57) ABSTRACT

A crankset assembly to be mounted on a bicycle includes at least one right-hand bearing for mounting a crankset shaft and a force sensor positioned around the outer ring of the bearing. The force sensor includes a peripheral portion, a central portion, and a top frame connecting a top section of the peripheral portion to a top portion of the central portion. The frame is positioned at a diameter oriented along an axis (Y'). The axis (Y') makes an angle (φ) of between 10° and 30° with the vertical axis (Y) and the top frame is positioned behind the vertical axis (Y).

14 Claims, 14 Drawing Sheets

(51) Int. Cl.
   *B62J 45/421*   (2020.01)
   *B62M 3/00*     (2006.01)

(56) References Cited

U.S. PATENT DOCUMENTS

| | | | | |
|---|---|---|---|---|
| 8,887,581 | B2* | 11/2014 | Zaaijer | G01L 1/2231 |
| | | | | 73/862.041 |
| 12,043,122 | B2* | 7/2024 | Mercat | B62J 45/411 |
| 2010/0282001 | A1 | 11/2010 | Sasaki | |
| 2012/0173167 | A1* | 7/2012 | Lukatela | B62M 3/16 |
| | | | | 702/42 |
| 2012/0285264 | A1 | 11/2012 | Sasaki | |
| 2012/0285265 | A1 | 11/2012 | Sasaki | |
| 2014/0001728 | A1* | 1/2014 | Hilfiker | B62J 45/41 |
| | | | | 73/862.626 |
| 2017/0356816 | A1 | 12/2017 | D'Elia et al. | |
| 2020/0166421 | A1 | 5/2020 | D'Elia et al. | |
| 2023/0194365 | A1* | 6/2023 | Salvador Lou | B62J 45/411 |
| | | | | 73/862.628 |

FOREIGN PATENT DOCUMENTS

| | | | | |
|---|---|---|---|---|
| WO | WO-2013042319 | A1* | 3/2013 | B62M 6/50 |
| WO | WO 2014/145277 | A1 | 9/2014 | |

OTHER PUBLICATIONS

International Search Report issued on Oct. 5, 2020 in PCT/FR2020/000122 filed Apr. 15, 2020, 3 pages.
Combined Chinese Office Action and Search Report issued Feb. 7, 2024 in Chinese Patent Application No. 202080044056.0 (with English translation), 14 pages.

* cited by examiner

Fig. 6
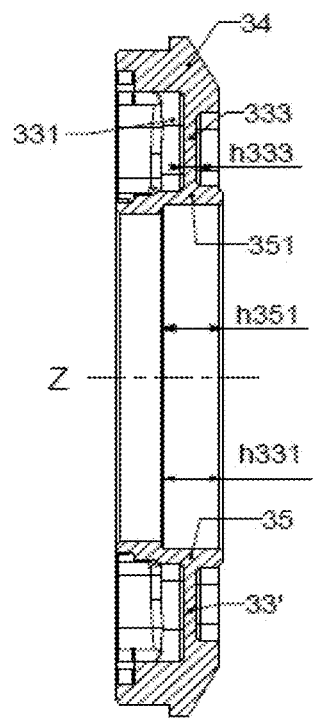
Fig.6
Fig. 7
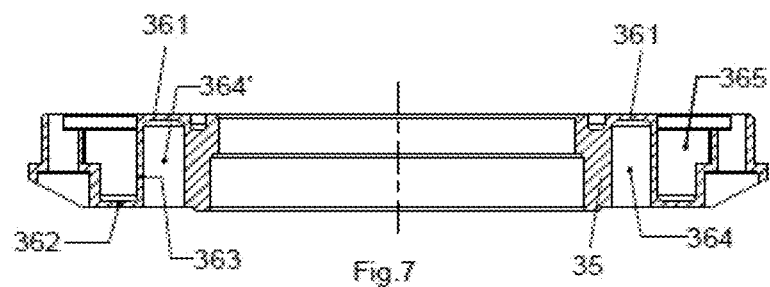
Fig.7

Fig. 9
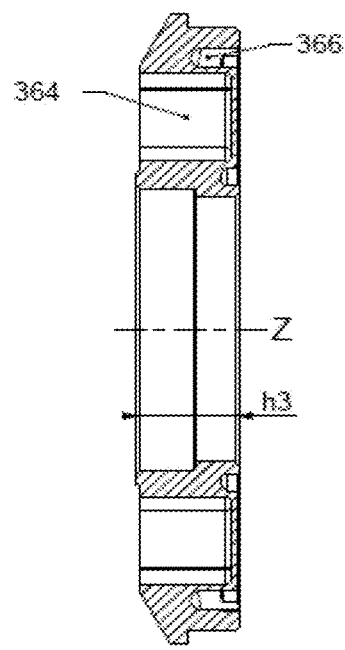
Fig.9
Fig. 10
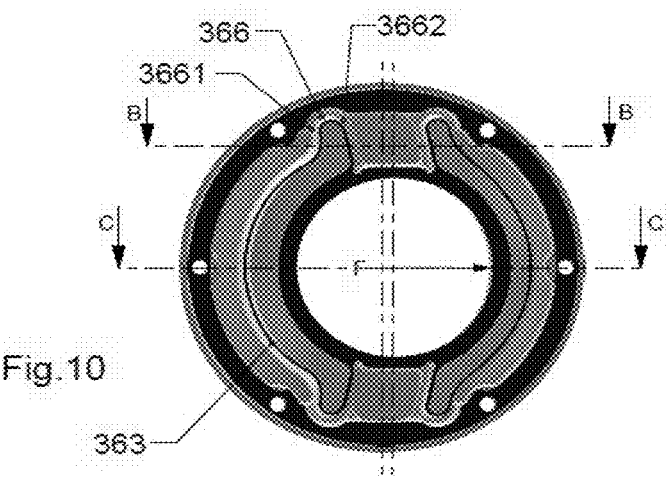
Fig.10
Fig. 11
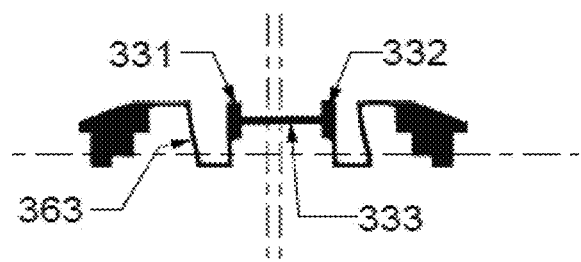
Fig.11

Fig. 12
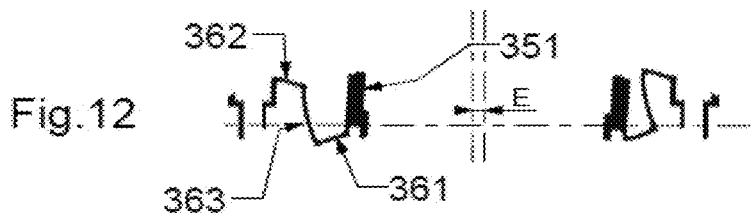
Fig. 13
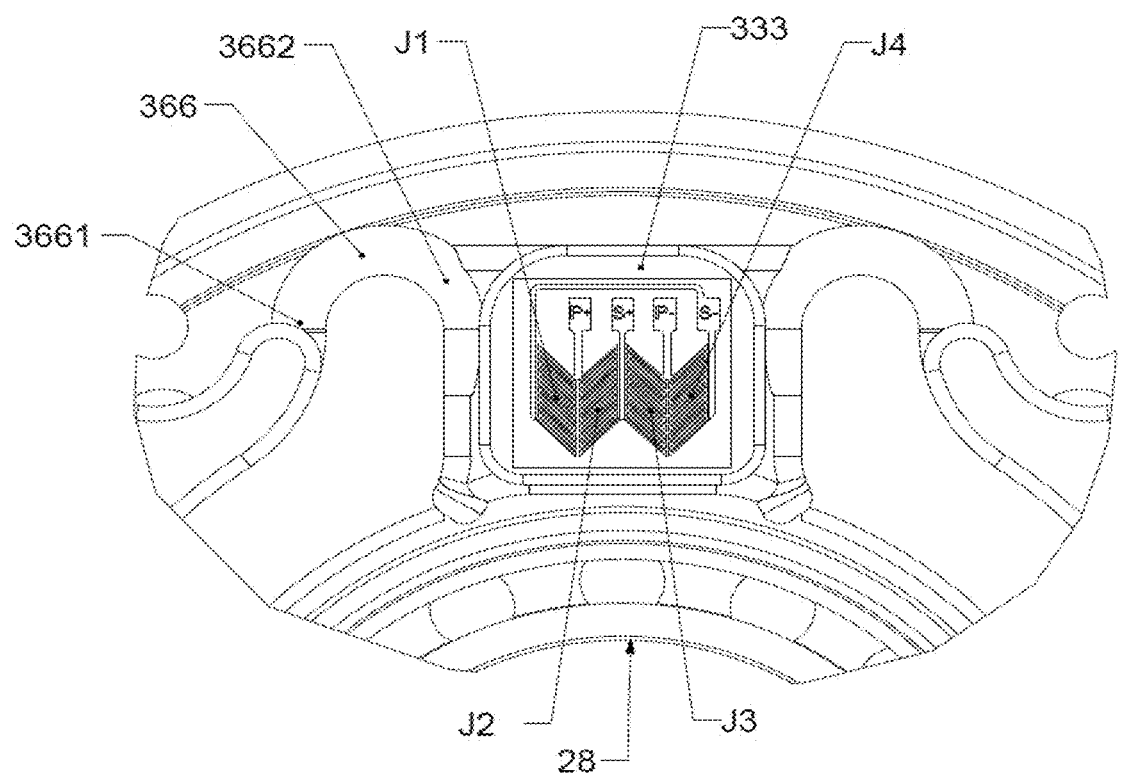
Fig.13

Fig. 14
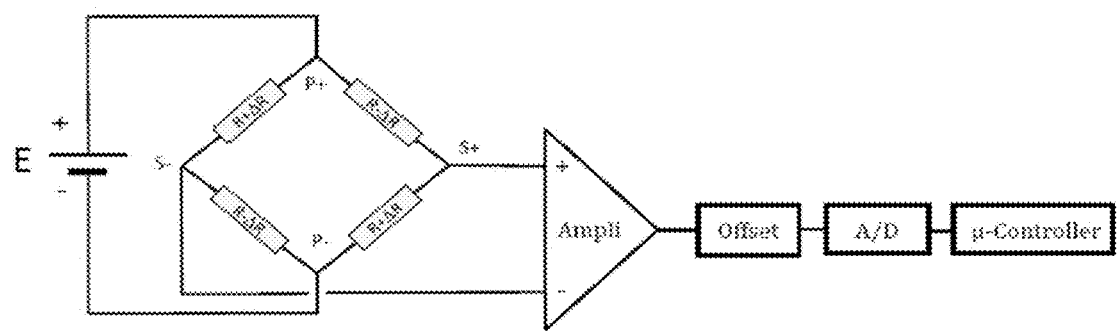
Fig.14
Fig. 15
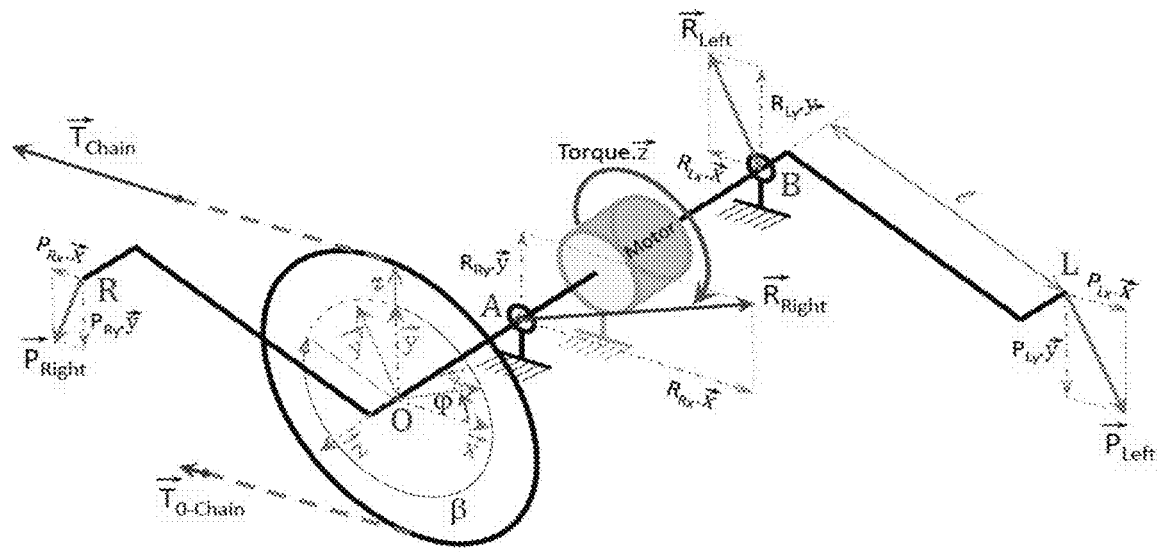
Fig.15

Fig. 16
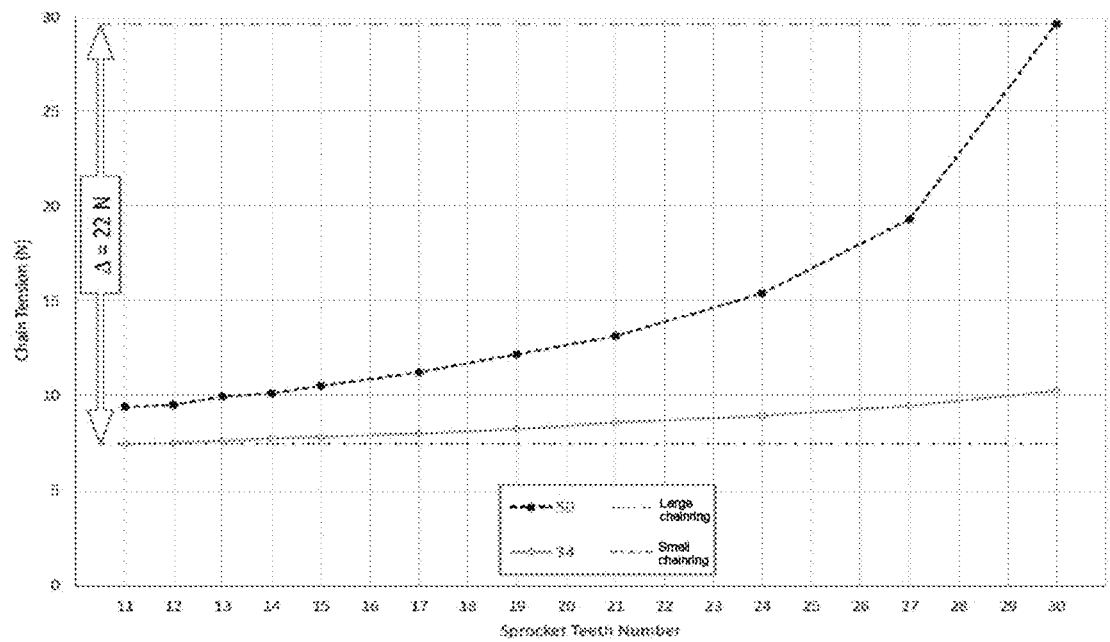
Fig. 16
Fig. 17
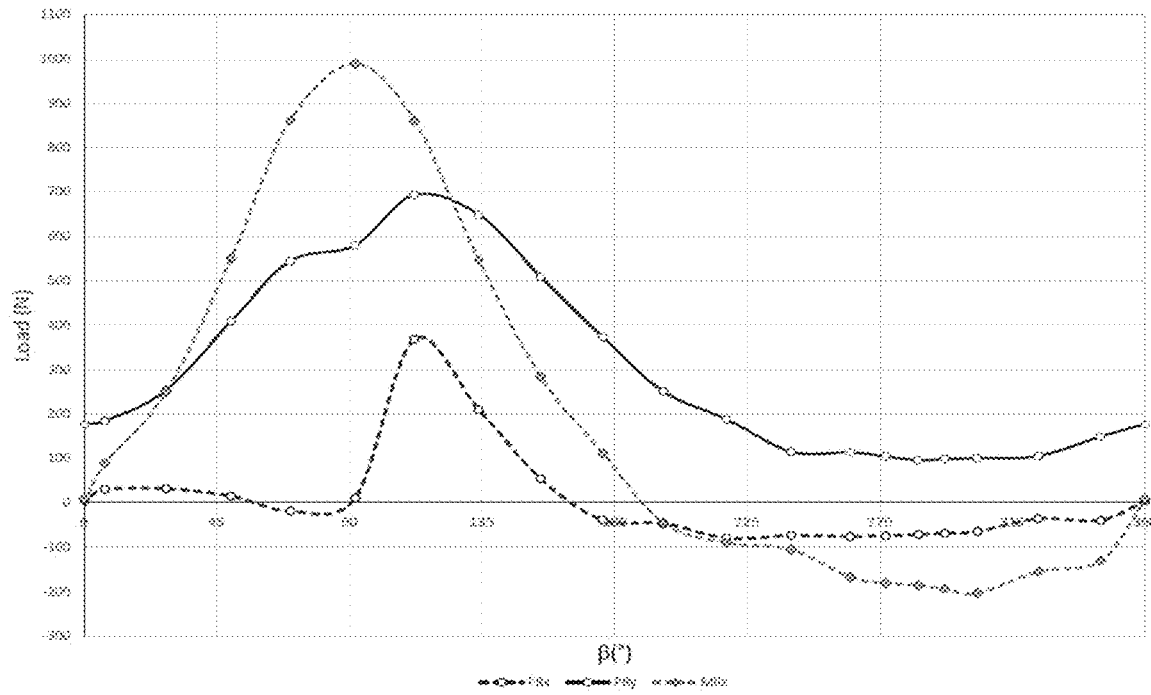
Fig. 17

Fig. 18
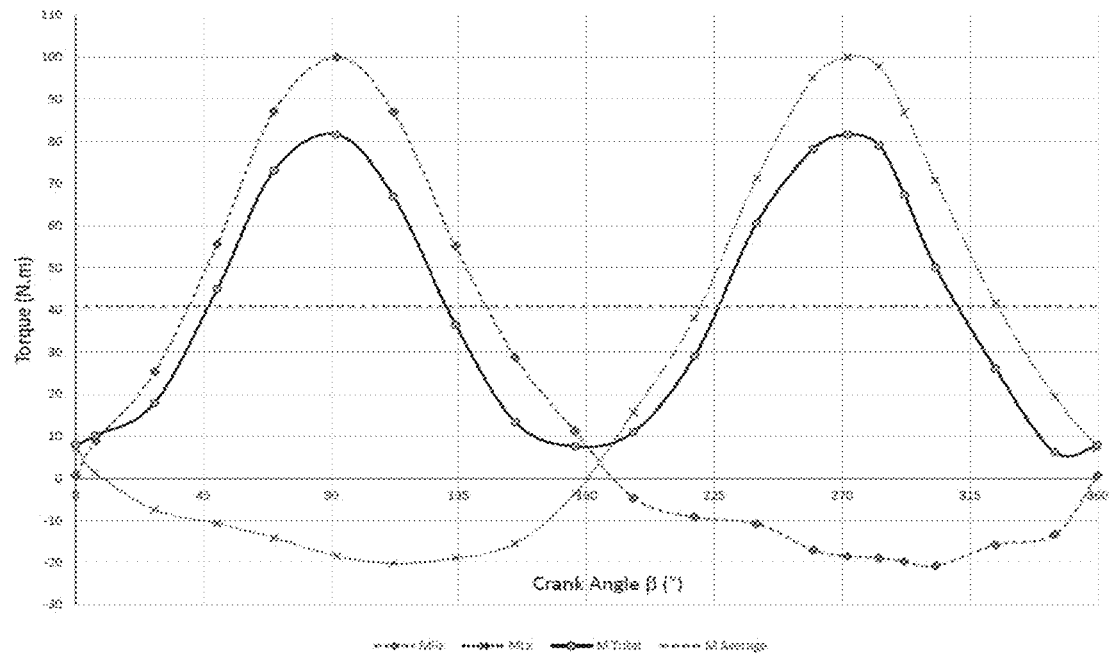
Fig.18
Fig. 19
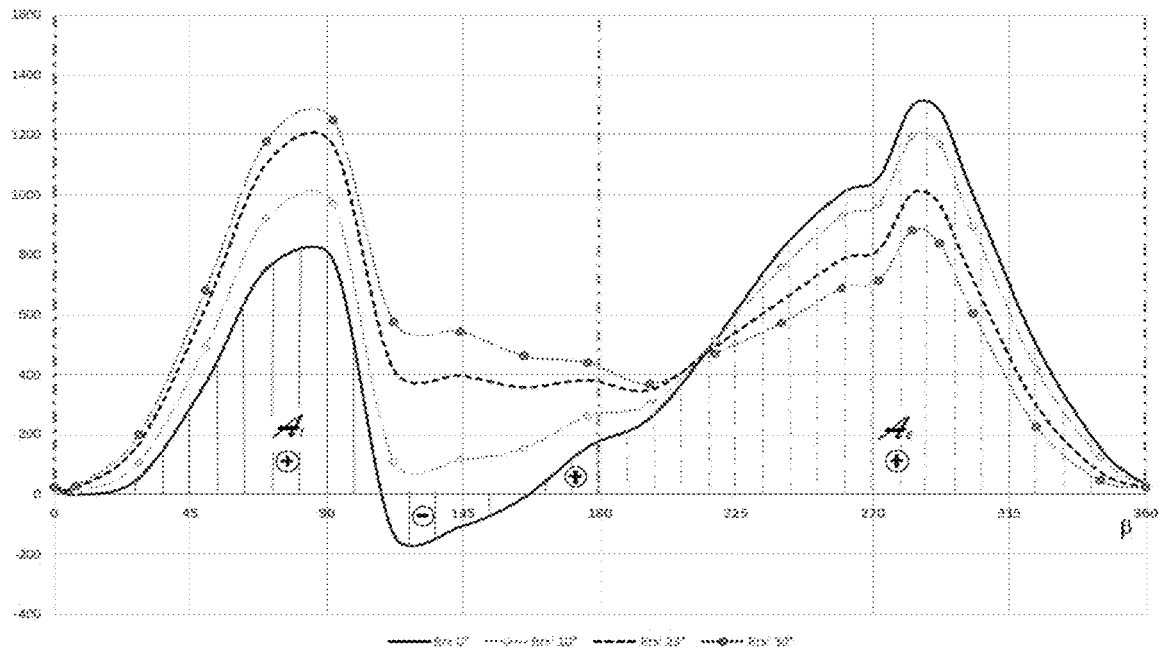
Fig.19

Fig. 20
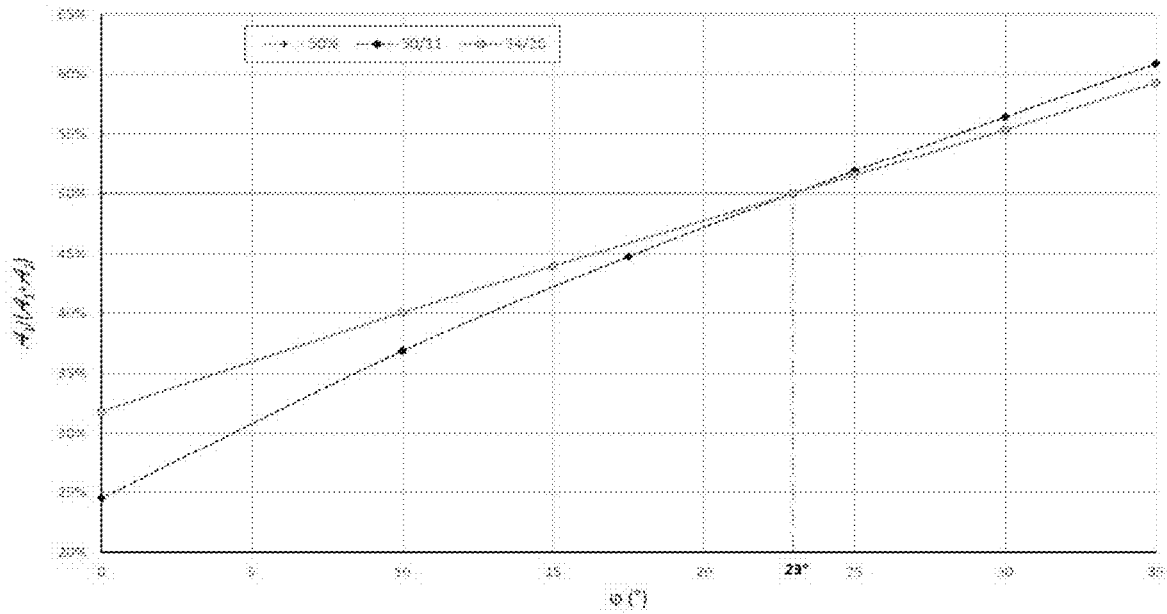
Fig. 20
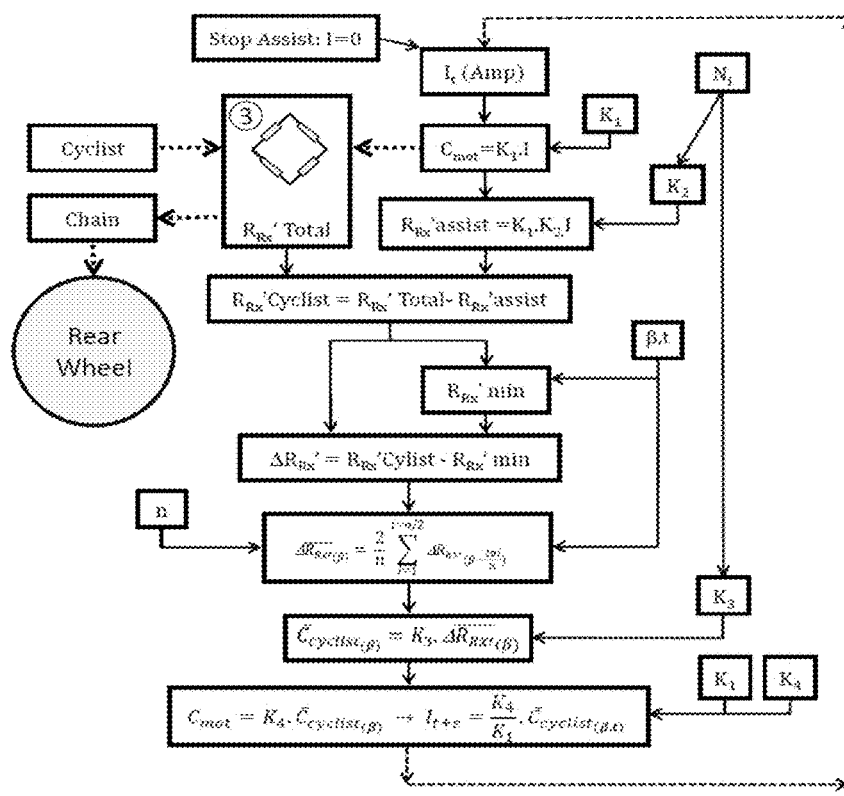
Fig. 21

FORCE MEASUREMENT SENSOR FOR A CRANKSET

TECHNICAL FIELD

The invention relates to a device for measuring the force exerted on a shaft driven in rotation. In particular, the invention relates to a proof body used to measure forces on a rotating shaft. In the area of bicycles, the crankset spindle is a rotating shaft which is driven in rotation by pedals and to which the measurement device of the invention can be applied. However, the invention is not limited to simple application of force measurement on a crankset spindle. Nevertheless, hereinafter in the description, the invention will be described for an application to measuring the torque of a bicycle crankset spindle and in particular a crankset spindle of an electric power-assisted bicycle.

BACKGROUND

Measuring the torque which is exerted on a rotating shaft is more difficult to perform than measuring a torque or a force which is exerted on a fixed element. In fact, if, for the force measurement, extensiometry gauges are glued onto the rotating shaft, it is necessary to provide for transmission of the measurements made on the shaft to an external unit in order to process and/or display the signal. It is then necessary either to add a revolving slip ring, which will generate friction and interference, or to arrange processing electronics revolving with the shaft with its own power supply and a wireless data transmission system for retrieving the information, which is complex, costly, unreliable and likely to create a delay in the processing of the signal.

In order to avoid the need for a revolving slip ring or a wireless transmission device, relocating the measurement has been considered so that the measurement is not done directly on the revolving shaft but on an outer bearing ring. This latter possibility was notably used in the patent US 2010/282001. This document describes a sensor that makes it possible to measure the force of a bottom bracket shell bearing, notably to measure the component Fx (chain tension). The sensor comprises two extensiometry gauges positioned at +/−45° on an arm supporting substantially half the force of the bearing (top half/bottom half). This sensor does however have many drawbacks. First of all, since the gauges are mounted on the outer wall of the small arm, they are highly sensitive to the bending and twisting moments to which the arm is subjected. Now, a good sensor should be sensitive only to the component that is being sought to be measured, here Fx, and to be as insensitive as possible to the other components Fy/Fz/Mx/My/Mz. To attenuate the sensitivity to the moment Mx/My/Mz, two pairs of gauges are positioned on two opposing faces of the arm, which makes the gluing thereof complex and significantly increases the cost. Furthermore, the deformation gradient of the arm in the zone where the gauges are glued is very significant, so any inaccuracy in the gluing of the gauges has a great influence on the sensitivity of the measurement.

The sensor described in the document US 2010/282001 has three wide apertures which complicate not only the sealing of the bottom bracket shell, but also the protection of the gauges themselves. In fact, the deformation gauges which measure μ-deformations reflected by μ-resistance variations, require very good protection against damp and chemical and mechanical attacks. In the prior art solutions and notably in US 2010/282001, the gauges are visible and require the use of lacquer or gels to protect them. All these products have multiple drawbacks. They are generally expensive, and their implementation is also costly because they entail fairly long polymerization times. They are subject to deterioration, over time, caused by their environment (UV, ozone, greases, dampness, acid/bases, etc.). Because of their weak mechanical resistance, they are highly vulnerable to external attacks (strike from a screwdriver, thrown stone, bicycle being dropped, transportation, maintenance, etc.). Furthermore, despite the low modulus of the gels employed, their properties vary with temperature and aging and can induce a viscous friction that disrupts the offsets and the calibration of the sensor.

Finally, the document US 2010/282001, which describes a sensor, the objective of which is to measure the chain tension, in reality measures the horizontal resultant exerted on the ball bearing. Now, while this resultant is the most influenced by the chain tension, notably when the chain ring is small, that is not exclusively the case. In fact, this horizontal resultant is also influenced by the horizontal component generated by the cyclist. Consequently, a horizontal action directed forward on the right pedal weakens the signal while the same action on the left pedal boosts the signal. That is why the measurement supplied by the sensor described in that document will be much more sensitive to the action of the left pedal rather than to the right pedal. In the case where such a sensor might be wanted to be used in the servocontrol loop of an assist motor for a bicycle, this variation of sensitivity to the actions of the right and left pedals would lead to a variation of the motor control setpoint during a crankset rotation.

The document US 2012/282264 has proposed an improvement to the accuracy for the measurement of the chain tension. However, for this, it was necessary to put in place a second measurement channel, these are the two structures for detecting translation in the directions D1 and D2, to which is added an orientation detector. Such a device is particularly costly and difficult to develop. Indeed since it takes numerous gauges to obtain these multiple measurement channels, complex instrumentation and extremely tedious calibration are needed to correctly realize this improvement. Furthermore, the document US 2012/282264 describes a method for determining transmitted torque which is based on the determination of the chain tension by assuming that there is no horizontal component, either from the right pedal or from the left pedal. Now, this type of calculation gives an overstated value of the left pedal and a very understated value of the right pedal.

The sensors in general have various defects and one of the main defects is due to the lack of stability of the offset, which drifts very often with temperature and the thermal stability of the sensor. To have a relatively minimal offset drift, it is desirable for the full-scale signal of the sensor to be high in order for the relative offset to be as low as possible, in other words the sensor must be dimensioned as close as possible to the maximum full scale to be measured.

BRIEF SUMMARY

The objective of the invention is to provide a crankset assembly equipped with a sensor that makes it possible to measure the forces to which the crankset is subjected which does not exhibit the drawbacks of the prior art.

The objective of the invention is also to provide a sensor which, when it is installed on the bottom bracket shell of a bicycle, makes it possible to determine the torque transmitted by the cyclist to the drive wheel of the bicycle.

The objective of the invention is also to provide a sensor and a method to make it possible to measure the torque that the cyclist transmits to the drive wheel of the bicycle in a most accurate, efficient, reliable and inexpensive way possible.

In particular, and in the case of an electric power-assisted bicycle, the objective of the invention is to optimize the determination of the force supplied by the cyclist in order to effectively drive the electric-assist motor.

The objective of the invention is achieved by the provision of a crankset assembly designed to be mounted on a bicycle, said assembly comprising at least one bearing used to mount a crankset spindle and a force sensor placed around the outer ring of said bearing, said sensor comprising a top frame, said frame being placed between a peripheral portion and a central portion of said sensor and being placed on a diameter of said sensor which is oriented on an axis Y', the axis Y' forming an angle $\varphi$ of between 10° and 30°, preferably between 20° and 25°, with the vertical axis Y; and the top frame 33 being placed behind the vertical axis Y. This particular angular portion of the sensor optimizes the signal S values delivered by the latter. They notably make it possible to minimize the differences that exist in the trend of the signal between the two phases: descending right pedal and descending left pedal.

One of the advantages offered by the force sensor according to the invention compared to certain prior art solutions which make it possible to measure the torque which is exerted on a rotating shaft, is that the sensor, itself, is not a revolving part and that it is, consequently, much more easy to instrument using strain gauges.

In a preferred embodiment, the force sensor comprises only a single measurement channel making it possible to determine the component in the direction X' at right angles to the axis Y' of the forces to which the sensor is subjected. Advantageously, the fact of having only a single measurement channel which directly gives a signal representative of the transmission torque of the crankset and the fact of inclining the proof body by 10° to 30° makes it possible to equalize the contribution of the right leg and of the left leg with no other artifice.

In one embodiment of the invention, said frame comprises a web plate bracketed by two arms that are substantially parallel to one another, such that said top section of the peripheral portion, said top portion of the central portion and the two arms form a parallelogram. The thickness of the web plate, on the axis Z, is less than 50% of the thickness of the arms. Thus, the arms are solid and offer a good resistance to the stresses oriented along their greatest length (axis Y'). On the other hand, the parallelogram-type structure of the structure of the frame facilitates the deformation thereof in response to stresses oriented at right angles to the arms (axis X'). Finally, the relative weakness of the web plate offers only little resistance to the deformations of the structure of the frame.

Preferably, the web plate, which is in contact with the two arms with the top section of the peripheral portion and with the top portion of the central portion, forms part, with the two arms, the top section and the top portion, of one and the same produced in the same material.

Preferably, the web plate is planar and oriented on a radial plane, at right angles to the axis Z, and it occupies a central position with respect to the arms.

The web plate is used for the placement of the strain gauges. Preferably, four strain gauges are glued onto the web plate.

In a preferred embodiment, a second frame substantially identical to the first frame links the peripheral portion to the central portion, said first frame and said second frame being diametrically opposed.

Preferably, a bellows links the peripheral portion to the central portion over the entire circumference apart from the zones occupied by the frame or frames. The bellows guarantees the sealing of the sensor without hampering the deformation of the frames in the direction X'.

In a preferred embodiment, the bellows comprises an inner wall in contact with the central portion, an outer wall in contact with the peripheral portion and a central wall linking the inner wall to the central wall. The inner wall and the outer wall are substantially planar and oriented on a radial plane, at right angles to the axis Z, and the central wall is substantially cylindrical.

Preferably, the thickness of the walls of the bellows is relatively thin, notably between 0.5 mm and 0.8 mm.

In a preferred embodiment, all of the sensor is produced in one and the same piece, for example by machining from a block, or by 3D printing.

The invention is also achieved by the implementation of a method for controlling an electric power-assist motor for a bicycle, said bicycle being equipped with a crankset assembly as described above, which is itself equipped with a sensor in accordance with the above paragraph. In this method:

the signal S generated by the force sensor corresponds to the component on an axis X', X' being at right angles to Y' and to Z, of the action $R_{right}$ being exerted on a right-hand bearing of the crankset assembly, this component being denoted: $R_{Rx}$.Total.

The part of the component $R_{Rx}$. Total, which is generated by the cyclist $R_{Rx}$.Cyclist is equal to: $R_{Rx}$.Cyclist=$R_{Rx}$.Total–$K_1 \cdot K_2 \cdot I$; (I is the current consumed by the electric-assist motor; $K_1$ is the constancy of torque of the electric-assist motor and $K_2$ is a factor dependent on the number of teeth of the chainring meshing with the transmission chain).

On each pedal revolution, the minimum value of the component $R_{Rx}$.min is stored in memory; and in that, at each instant, this minimum value is subtracted from the portion of the component generated by the cyclist $R_{Rx}$.Cyclist; and in that an averaging operation is performed over a multiple of half-crankset revolutions:

$$\overline{DR_{Rx'Cyclist}(\beta)} = \frac{2}{n}\sum_{i=1}^{i=n/2} DR_{Rx'Cyclist}{\left(\beta - \frac{2\pi i}{n}\right)} \quad \text{[Math. 1]}$$

(n is the number of sampling values)

The method according to the invention notably makes it possible to overcome the influence of the offload chain tension and the temperature differences in the measurements of the torque generated by the cyclist.

BRIEF DESCRIPTION OF THE DRAWINGS

The invention will be better understood in light of the following description. The attached drawing comprises:

FIG. 6 is a view in cross section A-A of the sensor.

FIG. 7 is a view in cross section C-C of the sensor.

FIG. 9 is a view in cross section E-E of the sensor.

FIG. 10 is a rear view of the sensor when the latter is deformed.

FIG. 11 is a view in cross section C-C of the deformed sensor.

FIG. 12 is a view in cross section B-B of the deformed sensor.

FIG. 13 is a detail view showing the rear of the sensor.

FIG. 14 is a schematic view of the strain gauge wiring.

FIG. 15 is a schematic view of the crankset.

FIG. 16 is a graph representing the typical trend of the off-load tension of the chain $T_0$ as a function of the number of teeth of the sprocket of the rear sprocket cassette, and for a large chainring of fifty teeth (dotted lines) and for a small chainring of thirty-four teeth.

FIG. 17 is a graph showing the trend of the components exerted by the action of the cyclist on the right pedal.

FIG. 18 is a graph showing the pedaling torque exerted by the cyclist on both right and left pedals.

FIG. 19 is a view showing the trend of the signal from the sensor in a revolution of the crankset, the sensor being placed in four different angular positions φ=0°/10°/23° and 30°.

FIG. 20 is a graph representing the globally increasing trend of the pedaling torque of the cyclist as a function of the angle β of the crank, in order to explain an assistance torque servocontrol procedure.

FIG. 21 is a block diagram explaining the servocontrol principle of the device for measuring force and controlling the motor according to the invention.

DETAILED DESCRIPTION

Figure 1:
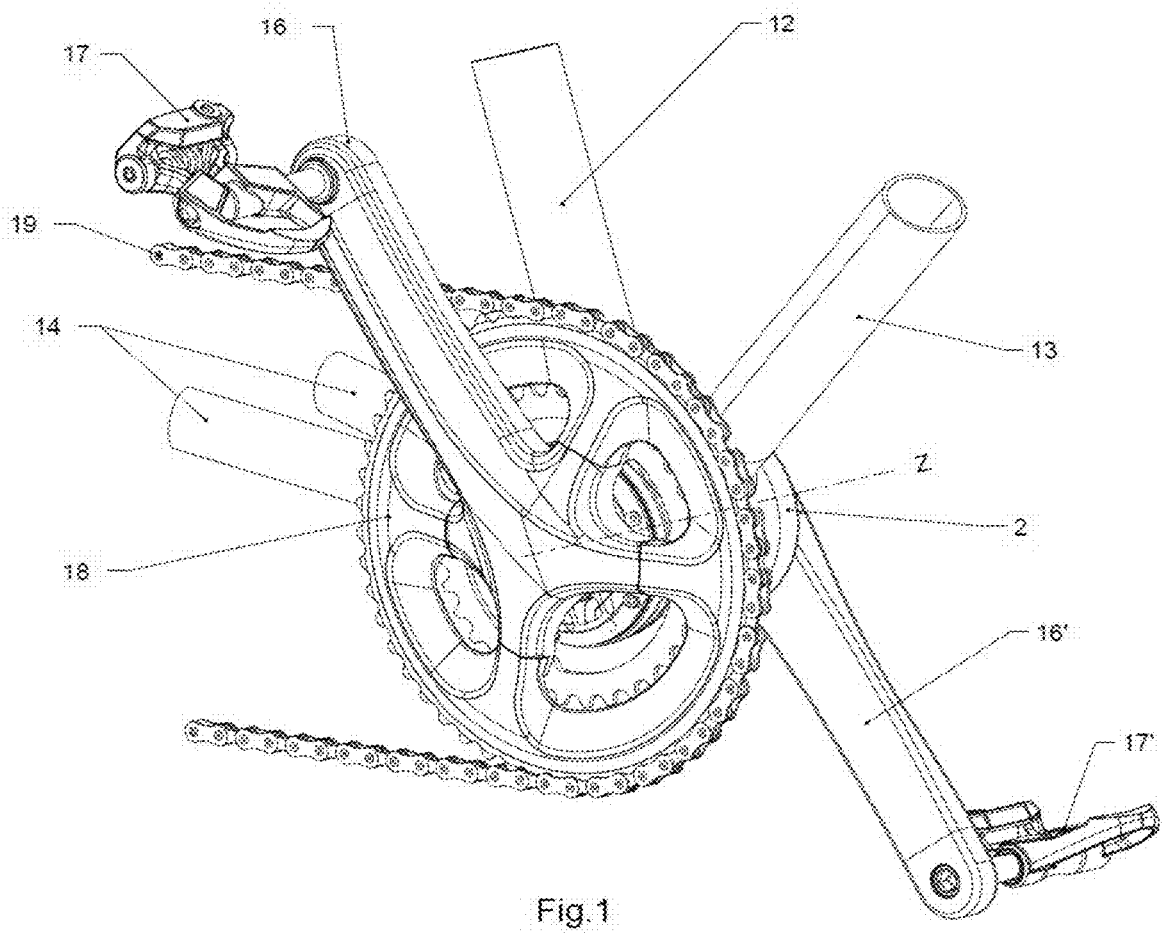
FIG. 1 is a perspective view of the central part of a bicycle.

FIG. 1 illustrates a bicycle 1 with electric power assistance incorporating a crankset assembly according to the present invention. As is known, this bicycle comprises a frame, to which two wheels are fixed. FIG. 1 is a partial view of the bicycle on which only the oblong tube 13, the seat tube 12, the rear bases 14 and the bottom bracket shell 2 located at the intersection of these various frame elements are visible.

The rear wheel (not represented) is the drive wheel and is driven by a transmission chain 19 by the crankset 15 composed of a spindle 4 to which cranks 16, 16' and two pedals 17, 17' are fixed. The right crank 16 comprises a spider 161 whose ends serve as fixing for a toothed chainring 18.

Figure 2:
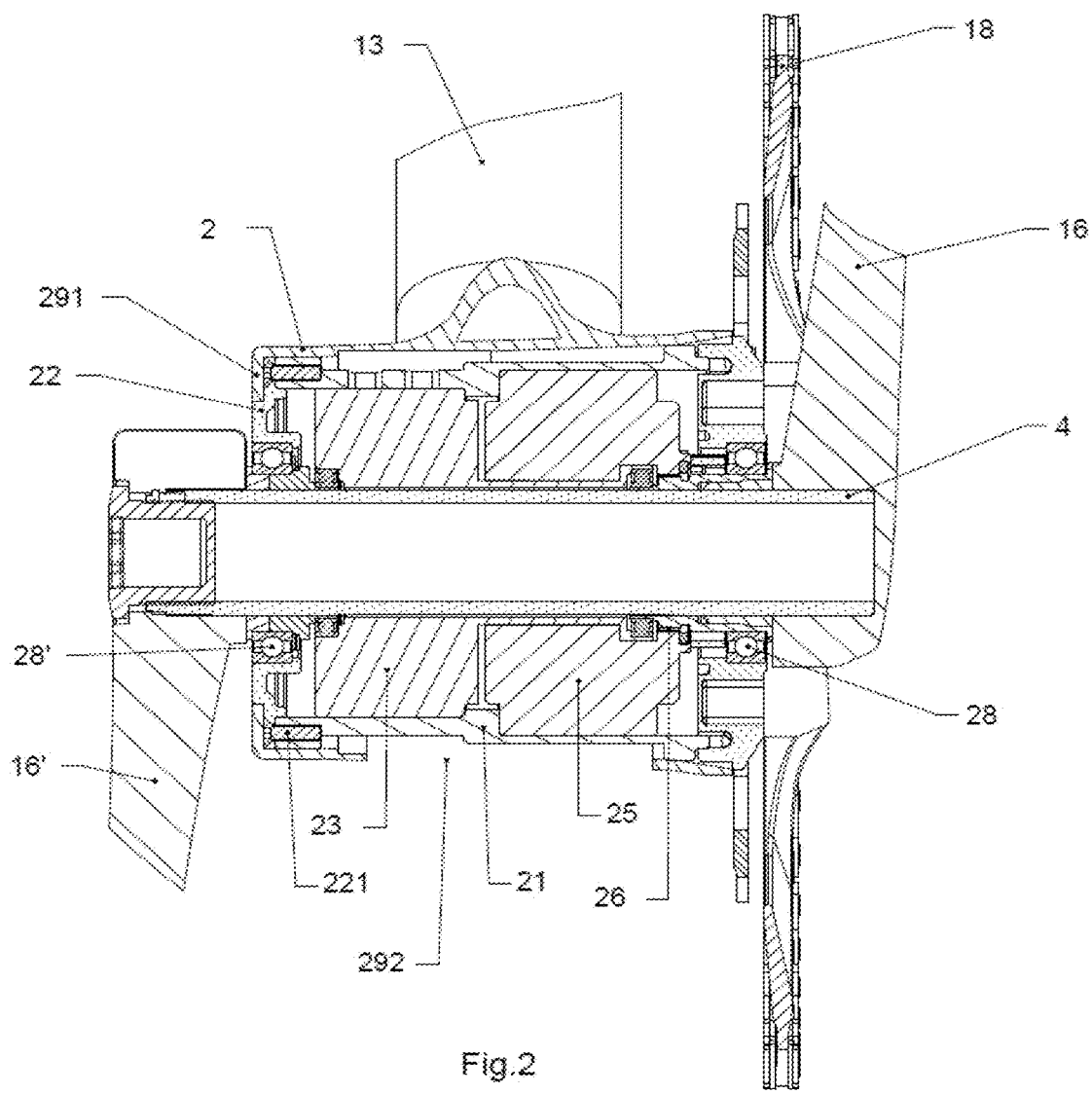
FIG. 2 is a cross-sectional view of the bottom bracket shell.

FIG. 2 shows in cross section the interior of the bottom bracket shell 2. In the example described, this is an electric power-assisted bicycle with central motor, that is to say one placed in proximity to the crankset 15. More specifically, as will be seen later in the text, the power-assistance motor is, not only situated within the very bottom bracket shell 2, but is coaxial with the spindle 4 of the crankset 15 and drives the latter directly. It should however be noted that these features are not limiting and that the force sensor according to the invention will be able to be used for other types of bicycle with electric power assistance (front motor, rear motor, friction roller, parallel central motor, etc.), for bicycles without power-assistance or even, more generally, to measure the forces to which a rotating shaft can be subjected.

The bottom bracket shell 2, which is an element incorporated in the frame of the bicycle 1, serves to house the casing 21 inside which are placed the motor 23, the gear 25, measurement and control means, and which is passed through by the spindle 4 of the crankset 15. The mechanical power generated by the motor 3 is transmitted to the gear 25 then to the spindle 4 via a free-wheel mechanism 26. On its right side, that is to say on the side of the toothed chainring 18, the casing is closed by the sensor 3. On its left side, it is closed by a cover 22. The cover 22 is fixed to the casing 21 by screws 221. The cover 22 and the sensor 3 have, at their center, a circular aperture at the periphery of which a seat is formed for the outer ring of a ball bearing. The right-hand bearing 28, placed in the sensor 3, and the left-hand bearing 28' placed in the cover 22 ensure the rotational mounting of the spindle 4 of the crankset 15 about the axis Z.

When assembling the bicycle, the casing 21 and all the various elements that it contains, is inserted into the bottom bracket shell on the right side thereof until the cover 22 comes to bear against the collar 291 which closes the interior of the shell 2 on its left side. Screws (not visible in the cross section of FIG. 2) fix the collar 291 and the casing 21, thus ensuring that the casing is held in the bottom bracket shell.

The bottom bracket shell 2 comprises an angular sensor (not represented) that makes it possible to determine the absolute angular position of the cranks, measured by the angle β represented in FIG. 13. This type of sensor can be produced by a magnetized crown ring revolving with the crankset opposite a Hall-effect magnetic sensor fixed onto the shell.

Figure 3:
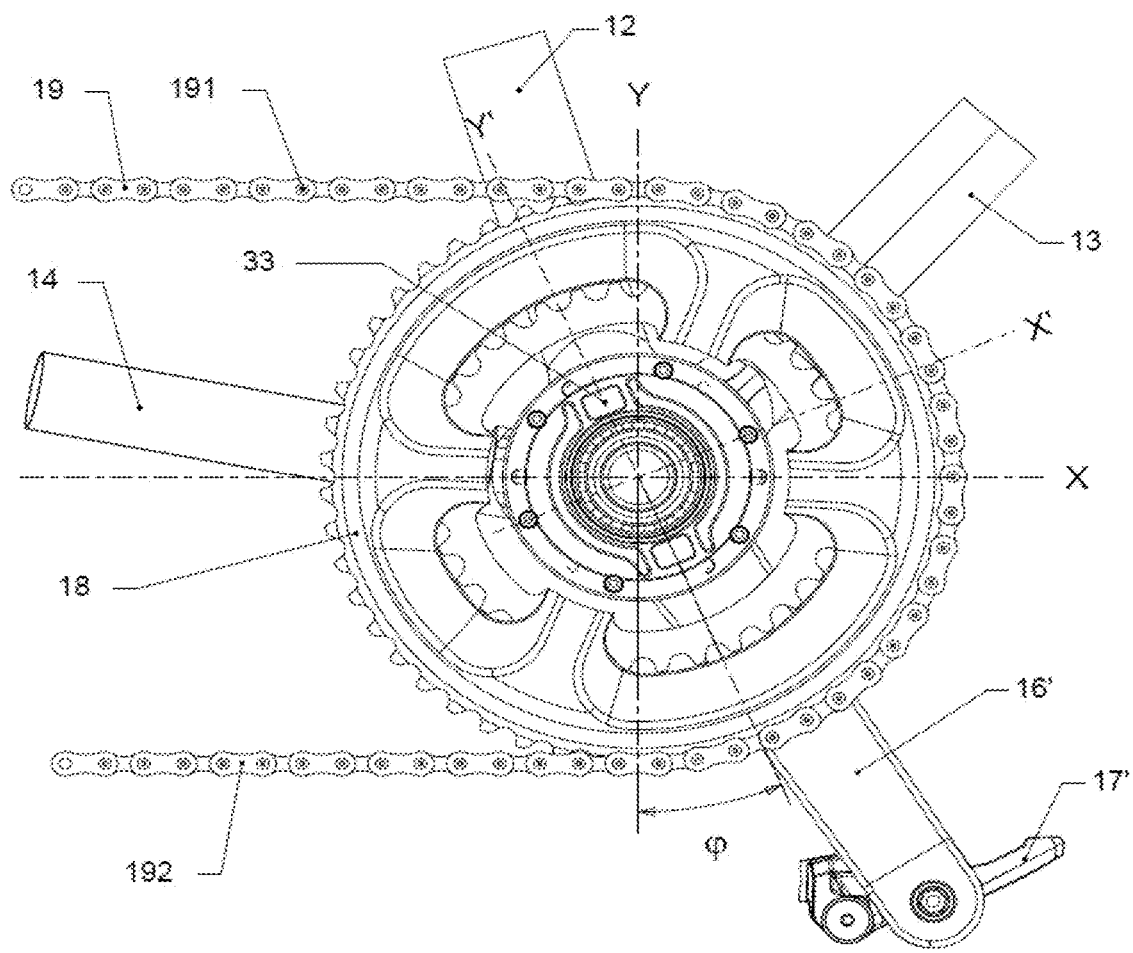
FIG. 3 is a partial front view of the bottom bracket shell.

FIG. 3 shows, by partial front view, the bottom bracket shell. In this view, the right crank 16 and the central part of the chainring 18 have been cut away in order to show the sensor 3 and the angular positioning thereof.

Figure 4:
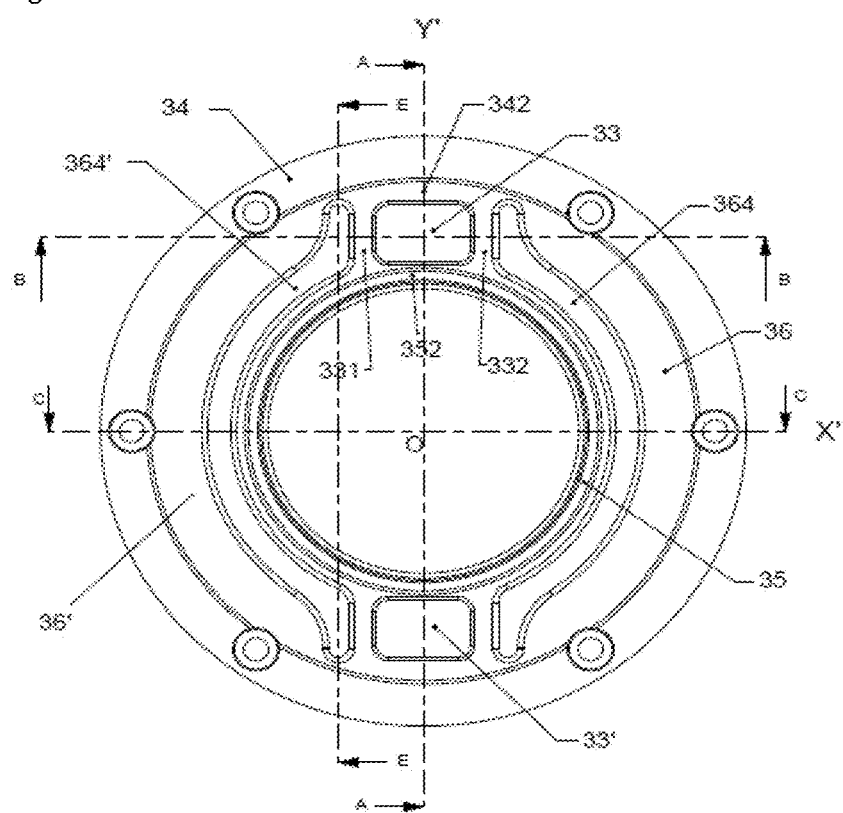
FIG. 4 is a front view of the sensor.
Figure 8:
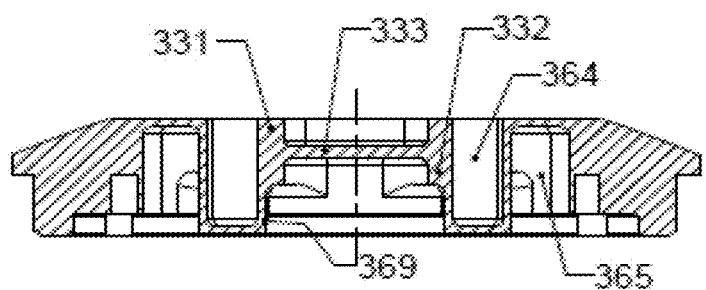
FIG. 8 is a view in cross section B-B of the sensor.

FIGS. 4 to 9 show the sensor 3 in detail. FIG. 4 is a view of the outer face, the view 5 is a view of the inner face. FIG. 6, respectively FIG. 9, is the view in cross section A-A, respectively in cross section E-E, on the axis Y', and FIG. 7, respectively FIG. 8, is the view in cross section C-C, respectively in cross section B-B, on the axis X'.

The sensor ensures multiple distinct functions. First of all, it closes the casing 21 and ensures its sealing on the right side thereof. Next, it participates in the rotational mounting of the spindle 4 of the crankset. For this, a seat 351 is formed at the center thereof. The seat 351 is a cylindrical surface whose height $h_{351}$ on the axis Z is equal to the height of the bearing. Finally, at least one of the zones of the sensor constitutes a proof body to which strain gauges are glued.

The sensor 3 has a substantially annular form. It comprises a peripheral portion 34 which is fixed by screws to the casing 21 and/or to the bottom bracket shell 2. This peripheral portion 34 which extends over the entire circumference of the sensor is relatively rigid and substantially non-deformable. The sensor also comprises a central portion 35 of annular form, relatively rigid and substantially non-deformable. It is in this central portion 35 that the seat 351 of the right-hand bearing 28 is formed.

The peripheral portion 34 and the central portion 35 are linked by two diametrically opposed frames 33, 33'. The top frame 33, respectively bottom frame 33', links the top, respectively bottom, peripheral 34 and central 33 portions. Each frame 33, 33' is composed of two arms 331, 332, substantially parallel to one another, and a web plate 333 placed between the two arms. On the axis Z, that is to say the axis of rotation of the crankset, the arms 331, 332 are placed facing the seat 351 of the bearing and have a height $h_{331}$ that is substantially equivalent to the height thereof $h_{351}$.

The right arm 331, the left arm 332, the top section 342 of the peripheral portion 34 and the top portion 352 of the central portion 35 together constitute a framework of substantially rectangular form which, under the effect of a force oriented on the axis X', can be deformed to assume the form of a parallelogram. The web plate 333 has a thickness $h_{333}$ much smaller than the height $h_{331}$ of the arms 331, 332.

The frames 33 and 33' are the two possible proof bodies of the sensor, that is to say the point where the strain gauges will be placed. In a preferred embodiment, only one of the two frames 33, 33' will be equipped with strain gauges, the latter being mounted in Wheatstone bridge configuration in order to power a single measurement channel. In an alternative embodiment, some of the strain gauges of the single Wheatstone bridge will be placed on the top frame 33, while the other gauges will be placed on the bottom frame 33'.

The sensor 3 also comprises two bellows 36, 36' which link the peripheral portion 34 to the central portion between the two frames 33, 33'. These two bellows exhibit a much lesser mechanical rigidity than that of the frames. FIG. 7 (cross section C-C) shows the profile of the bellows 36. The latter comprises an inner wall 361, which is in contact with the central portion 35, an outer wall 362, which is in contact with the peripheral portion 34 and a central wall 363 which links the above-mentioned two walls. The inner 361 and outer 362 walls are substantially planar and parallel to one another, but separated from one another by a value which corresponds substantially to the height $h_3$ of the sensor 3. The central wall 363 is substantially cylindrical. The thicknesses of the different portions of the sensor which constitute the bellows, namely the inner, outer and central walls, are small relative to the thickness of the arms.

FIG. 8 (cross section B-B) shows the profile of the bellows 36 when the latter is in contact with the arm 331. In this zone, it can be seen that the bellows comprises an additional wall 369 which extends the arm 331. This configuration allows the bellows 36 to be deformed even in its top end, respectively bottom end, placed against the top frame, respectively bottom frame.

The sensor 3 is preferably monobloc, and produced in a single material. For example, it will be able to be machined from a solid starting from a bar made of 7075 aluminum alloy that has a high yield strength and good fatigue properties. In this case, it can be machined directly on a two-arbor lathe without subsequent rework. The production of the bellows 36 being then done, on the one hand, by milling two outer cavities 364, 364' from the outer face of the sensor and, on the other hand, by milling inner cavities 365, 365' from the inner face of the sensor 3. Each of the outer cavities 364, 364' has the form of a portion of ring and whose ends run along the arms 331, respectively 331'. The inner cavities 365, 365' also have the form of a portion of ring. The milling of the cavities must be done with a very high degree of accuracy, given that the bottom of the outer cavity 364, respectively of the inner cavity 365, defines the inner wall 361, respectively the outer wall 362, and that the central wall 363 separates the outer cavity 364 from the inner cavity 365. The thinner the walls are, the more they will be able to be deformed, but, on the other hand, the more the machining will be complicated to perform, in practice, the different walls of the bellows have a thickness of between 0.5 mm and 0.8 mm, preferably approximately equal to 0.7 mm.

The two frames 33, 33' positioned symmetrically on either side of the bearing 28 and linking the outer ring of the bearing to the casing of the shell can very rigidly take up the different moments and all the components apart from the shear component of the frame 33 which will be taken up by the central web plate 333 linking the interior of the frame in a way similar to the canvas of a painting in its frame.

With such an arrangement, when a shearing force is transmitted between two opposing edges of the frame, main deformations will be generated at +/−45°. This can easily be understood by imagining a square, that is subjected to two opposing shearing forces oriented on two of these opposing sides. The square will then be deformed into a rhomboid and one of its diagonals will be elongated while the other will be shortened, thus generating opposing traction and compression deformations at +/'45° and that are virtually uniform over the entire surface of the square, making it possible to tolerate a greater positioning tolerance of the gauges because the deformation gradient is not significant in the central part of the frame.

Figure 5:
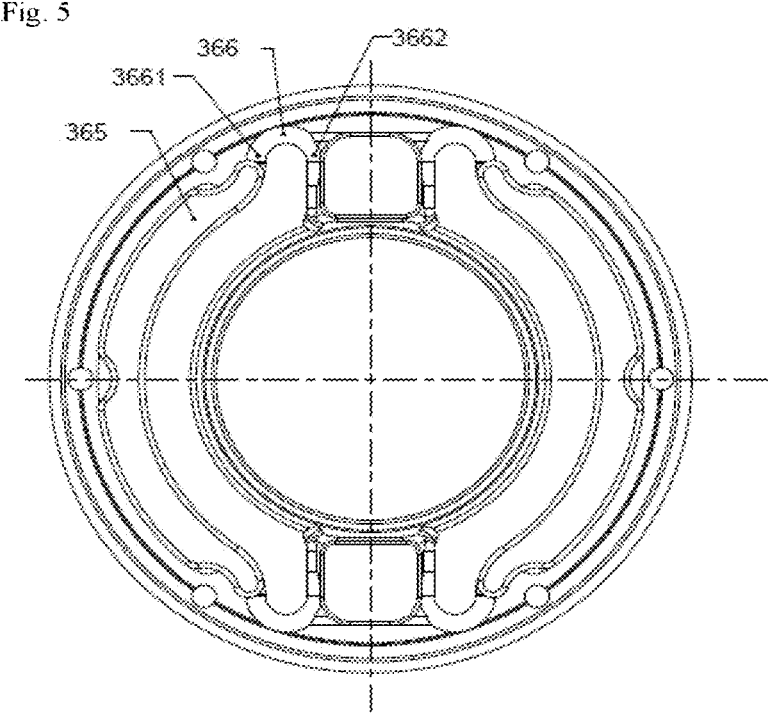
FIG. 5 is a rear view of the sensor.

FIGS. 10, 11 and 12 illustrate, in a view respectively similar to FIGS. 5, 7 and 8, the deformed sensor. These figures correspond to a deformation generated by the application on the axis X of a force F, of 4500 N amplitude, on the bearing. To make the deformations more visible, their amplitude is multiplied by 70 in these figures. It can notably be seen that the top and bottom frames are deformed while keeping a parallelogram form, so that the web plate 33 which is captive between the four members of the frame 331, 332, 342, 352 will undergo shear stresses, for which it will be seen later that they are measured by the strain gauges.

It will also be noted that the bellows 36 is sufficiently flexible for it to be able to be greatly deformed. In the design of the sensor, the dimensioning of the bellows is done for the stresses linked to the various loadings representative of the maximum forces in service not to exceed 250 MPa, preferably, not to exceed 160 MPa, in order for the sensor to have an unlimited alternating fatigue endurance.

Since the sensor 3 is top/bottom symmetrical (horizontal plane symmetry), the horizontal force transferred by the central bearing 28 will be transmitted equally by a shearing force passing through the top frame 33 and a shearing force passing through the bottom frame 33', so, the rigidity of the bellows 36 being almost negligible, it can be considered that approximately half of the shearing force will be transmitted by each of the frames 33, 33'.

In a first embodiment of the invention, only the top frame 33 serves as proof body and is equipped with strain gauges in order to supply the signal of the single measurement channel. FIG. 13 illustrates the mounting of the four strain gauges J1, J2, J3, J4 which are glued onto the inner face of the web plate 333. The gauges could also be fixed onto the bottom frame 33'. In this case, the signal collected will be identical, but of opposite sign.

The gauges are mounted in complete Wheatstone bridge configuration. The complete bridge is powered by a terminal P+ and P− and comprises two signal terminals S+ and S− which directly give the differential voltage reference of the measurement signal (to within the offset). The four gauges preferably comprise a median plane of symmetry with an alternation of orientation at +45°/−45°/+45°/−45°, the two end gauges are then connected to one another.

This type of sensor proves to be virtually symmetrical in traction/compression and there is therefore no notable difference in positioning the complete bridge in the top frame or bottom frame apart from the inversion of the sign of the signal, which simply amounts to swapping S+/S− or P+/P− to retrieve the same sign.

The particular form of the sensor 3 according to the invention, having two diametrically opposed frames, makes it possible to have a sensor which is sensitive only to the "horizontal" force (the force at right angles to the diagonal where the two frames 33 are located). It should also be noted that the measurements performed on the sensor 3 reveal a relative vertical/horizontal sensitivity of 0.3% and a relative axial sensitivity of 0.5%, and, as for the sensitivity to the three moments $M_X$, $M_Y$ and $M_Z$, it is also very low. This low sensitivity to the moments is also a consequence of the fact that the sensor 3 is mounted on the outer ring of a bearing and that a ball bearing has a friction torque on its axis ($M_Z$) that is extremely low and that the two other moments ($M_X$, $M_Y$) remain very low because they allow only very little buckling moment.

The sensor described in the figures gives a measurement signal of 2.5 mV/V in full scale for a horizontal force of 4500 N, and its hysteresis is only approximately 0.1% between the rise in effort and the fall in effort.

As stated above, the sensor 3 is produced in aluminum alloy. It can also be produced in alloy steel. In this case, with identical dimensions, the sensitivity will be approximately three times lower (ratio of the moduli of elasticity) but the full horizontal force measurement scale will be substantially multiplied by three, the deformable bellows function then remains perfectly functional.

With a sensor 3 produced in aluminum alloy, a maximum horizontal force of 4500 N produces a shearing displacement of the frame of the order of 0.06 mm, thus ensuring a very good rigidity at the sensor.

The deformable membrane of the bellows, which comprises the different walls, is designed in this embodiment with a nominal thickness of 0.7 mm, it has a perimeter that is long enough to be very flexible and thus have a maximum strain level less than 160 MPa under the maximum load of 4500 N, ensuring that it has an unlimited fatigue life under this alternating loading.

The most critical zone in terms of design is undoubtedly the zone of connection of the arms 331, 332 of the frame 33 with the peripheral portion 34. This fairly concentrated zone has a level of deformation projected onto a plane at right angles to the axis that is very dense and it is necessary to produce a membrane zone that is substantially cylindrical and thin, allowing it to be deformed shear-wise without ramping up to a high strain level. Thus, the terminal portion 3631 of the central wall 363 which ensures the connection between the latter and the arm 331, respectively 332, is cylindrical. This terminal portion 3631 is bordered by a cavity 366. This cavity is produced here using a hemispherical milling tool of 2.5 mm diameter ensuring a connection radius of 1.25 mm that is sufficient to prevent the strains from becoming excessive. The depth of the machining is, here, variable and is greater in the distal portion 3661 of the cavity 366, the portion juxtaposing the inner cavity 365, than in the proximal portion 3662, that is to say the one placed directly in proximity to the arm 331. This configuration has the effect of reducing the transverse rigidity of the terminal portion 3631, thus reducing the strains at the base of the cylinder.

FIG. 14 describes the measurement chain used with the sensor of the invention. As is reviewed hereinbelow, the four gauges are mounted in Wheatstone bridge configuration. Such mounting is commonly used in extensiometry. The four resistors are mounted in a series loop, represented schematically by a square, one diagonal is supplied by a DC voltage E and the other diagonal measures a signal ΔE which is proportional to the resistance variations of the four branches, according to the formula:

$$\frac{\Delta E}{E} = \frac{(\Delta R1 + \Delta R2 - \Delta R3 - \Delta R4)}{4R} \qquad \text{[Math. 2]}$$

The voltage E applied to the bridge is generally a DC voltage of a few volts (5 V) but can be sampled in order to reduce the heating by Joule's effect and the consumption of the bridge. The resistors are composed of deformation gauges commonly called strain gauges, whose electrical resistance varies in proportion to the longitudinal deformation ε (ε=ΔL/L) of the grid of this gauge according to the law:

$$\frac{\Delta R}{R} = K \frac{\Delta L}{L} \qquad \text{[Math. 3]}$$

A formula in which the gauge factor, K, is a function of the material of the gauge but generally of the order of 2.1.

To obtain a bridge that has a very good sensitivity, it is desirable to produce a complete bridge having four active gauges with, for example, two gauges J1 and J3 working in extension and the other two gauges J2 and J4 working in compression. Knowing that the resistance variation of the gauges is also a function of their temperature, it is highly desirable to mount these gauges on a proof body that has a uniform temperature or to mount them at least two by two on a temperature-uniform support, this type of mounting making it possible to make a bridge that is theoretically self-compensated in temperature, which makes it possible not to have signal variation with the temperature. Nevertheless, a temperature probe can be incorporated in addition on the gauge to produce a compensation of higher order if the self-compensation were to prove insufficient.

The small resistance variations linked to the manufacturing tolerances of the gauges or to the residual stresses induced during the gluing mean that an offset of the bridge has to be produced in order to add or subtract a constant to compensate the measured signal and have a signal that is strictly proportional to the force applied to the proof body of the sensor.

The signal from the bridge is sought to be maximized so as to limit the amplification necessary to its conditioning. That is why it is desirable to maximize the deformation undergone by the four active gauges. However, the deformations must not exceed three limits linked to the yield strength and the fatigue strength of the material of the proof body and the fatigue strength of the resistive material of the gauges.

In fact, the yield strength of the proof body, here the web plate 333, should be such that it creates no plastic deformation or hysteresis during significant loading cycles. Preferably the sensor will be chosen to be made from a material that has a good level of elastic deformation. In addition, there should be no risks of breakage of the proof body by fatigue under repeated loading cycles. To this end, the proof body has to be well dimensioned in order to avoid stress concentrations that can be critical in terms of fatigue. The aluminum alloys of the 2000 and 7000 series or the heat-treated alloy steels are well suited to meet these two requirements.

On the other hand, the admissible deformation of the gauges must be limited for their grid not to break through fatigue. It is generally accepted that, with the best materials used to produce the gauges, it is necessary to limit the deformation to +/−1200 μm/m in the case of a ripple stress and to +/−1300 μm/m in the case of an alternating tensile stress in order for the life of the sensor to be virtually unlimited. It is very often this third limit which is critical in the dimensioning of a gauge bridge. In the case of a sensor that has four active gauges, and assuming a typical gauge factor of 2.1, a full-scale maximum signal is obtained of approximately 2.5 mV/V (2.1×1200.10−6).

Finally, an adjustable resistor of low value can be added in series on one of the branches (positive or negative) of the power supply, in order to calibrate, in a calibration procedure, the sensitivity of the sensor to a very precise value in order to avoid having to enter a calibration coefficient to the microcontroller specific to each sensor. This placement of a resistor in series has the drawback of slightly attenuating the sensitivity of the sensor.

As can be seen in FIG. 14, the Wheatstone bridge, equipped with four active gauges, is supplied by a DC voltage E between P+ and P− and the measurement signal is picked up between S+ and S−, this signal is then amplified using a differential amplifier 72, then the offset of the bridge is subtracted before this analog signal is converted into a digital signal by an analog/digital converter 73 to be processed by the microcontroller 74.

The differential amplification stage can be directly incorporated on the microcontroller component with a low-level differential input and a programmable gain.

The offset procedure can advantageously be processed digitally by the microcontroller, but this method does however require a limited amplification so as not to saturate the signal and an A/D conversion over a greater extent including the full measurement scale plus the offset amplitude, a conversion on 11 to 12 bits makes it possible to obtain an excellent resolution.

FIG. 15 schematically describes the bottom bracket shell and all of the forces to which the various elements are subjected. The points A and B correspond respectively to the pivot links provided by the bearings 28 and 28'. By isolating the crankset, the following six actions are found:

action of the left leg transmitted through the axis of the left pedal 17', which can be modeled as a force $P_{Left}$ passing through the axis and the median plane of the left pedal that can be broken down into a horizontal component $P_{Lx}$ and a vertical component $P_{Ly}$ (the axial component which does not generate torque is disregarded);

action of the right pedal 17, similar to the left pedal, that is modeled as a force $P_{right}$ passing through the axis and the median plane of the right pedal, that can be broken down also as a horizontal component $P_{Rx}$ and a vertical component $P_{ry}$;

action of the chain 19 on the chain ring 18. That is broken down into two actions: the action of the bottom strand 192 of the chain 19 of tension $T_{0\text{-}chain}$ which corresponds to the off-load tension of the chain in a substantially rearward direction (the axial component is disregarded) and the action of the top strand 191 of the chain which corresponds to the superimposition of the off-load tension $T_0$ and of the driving tension of the chain $T_{chain}$ (the axial component is also disregarded);

action of the right bearing $R_{Right}$, which can be modeled as an annular link that can be broken down according to a horizontal direction $R_{Rx}$ and a vertical direction $R_{Ry}$, and it can be noted that, since this bearing is very close to the chainring, it will therefore be highly influenced by the chain tension;

action of the left bearing $R_{Left}$, which can be modeled as an annular link that can be broken down according to a horizontal direction $R_{Lx}$ and a vertical direction $R_{Ly}$; and action of the power-assistance motor that can be modeled as a pure motor torque (denoted torque in the diagram) around the axis of rotation Z, it being noted that, according to the sign convention used in the diagram, a motor torque will here be negative.

The motor torque, $C_{motor}$, of the crankset is directly linked to the tension of the chain, $T_{chain}$, by the following relationship:

$$T\ \text{chain} = \frac{C\ mot\ or}{r} \text{ with} \qquad [\text{Math. 4}]$$

$r$ = primitive radius of the chainring = $N.p/2\pi$

The following relationship therefore applies:

$$T\ \text{chain} = \frac{2\pi C mot\ or}{Np} \text{ with} \qquad [\text{Math. 5}]$$

$N$ = number of teeth of the chainring and $p$ = chain pitch 12.7 mm

The off-load tension of the chain $T_0$ represented in FIG. 15 can be measured in the absence of transmitted torque, it is ensured by a spring position in the rear derailleur and generating a torque on the yoke of the two derailleurs jockey wheels. FIG. 16 represents, on the y axis, the typical trend of the chain tension (expressed in Newtons), as a function, on the x axis, of the number of teeth of the sprocket meshing at the rear wheel for a cassette of eleven sprockets with teeth numbering between eleven and thirty teeth, the graph comprises a first curve (continuous gray line) representing meshing conditions on a small chainring of thirty-four teeth and a second curve (black dotted line) representing meshing conditions on a large chainring of fifty teeth. It can be noted on reading these graphs that the off-load tension of the chain changes by approximately 3 N on the small chainring and it changes by approximately 20 N on the large chainring, the total tension variation is approximately 22 N as represented by the boxed arrow situated on the left of the graph.

It goes without saying that this change of tension depends on the type of derailleur used and on the number of teeth of the sprockets and of the chainrings on the chain length.

The off-load tension is applied to each top and bottom chain strand as can be seen in FIGS. 1, 3 and 15, these two substantially horizontal actions therefore generate a reaction substantially equal to twice the chain tension and therefore to the superimposition of a value of approximately $2.T_0$ in component $R_{Rx}$ on the right bearing at the center of the bearing A. When the offset of the sensor is produced, the effect of the superimposition of this component will be canceled, but if the cyclist then changes gear, a chain tension difference will then appear and the difference with respect to the value produced in the offset will no longer be compensated. This effect is not very significant in the case of single-chainring use because the tension variation can be less than 3 N which corresponds to a torque difference equivalent to 0.4 N·m with the small chainring of thirty-four teeth, but on the other hand, for double-chainring use as is represented in the figure B, it is highly recommended to correct the offset for the changes of gears in order to be sufficiently accurate, in fact a chain tension difference of 22 N on the large chainring of fifty teeth is reflected by a difference of 47 N on the bearing of the sensor $R_{Rx}$ which corresponds to an equivalent torque difference of 4.45 N·m, i.e. a power difference of 37 watts at 80 rpm which can therefore introduce an excessive inaccuracy.

In order to resolve this inaccuracy, three methods are proposed here:

The first is applied if the controller can have access to the instantaneous gear combination used by the cyclist, which is the case notably with speed changes with electronic control making it possible to broadcast the information on this gear combination, and it is then sufficient to load into a memory the content of a table giving a reference tension as a function of the current bracket and take account thereof also in the offset to obtain good correction. This first method requires entering into memory at least one value table or one law of change of tension as a function of the bracket combination and strictly observing the chain length recommendation.

A second method consists in calculating the bracket by measuring, on the one hand, the speed of the cycle using a fixed sensor positioned opposite the trajectory of one or more magnets revolving with one of the wheels and measuring the pedaling rate using the angular position sensor positioned in the casing 21, the ratio between these two rotation speeds will make it possible to determine the transmission ratio and therefore deduce the transmission ratio combination in a certain manner if the chainring used is also known, because there is an area of overlap between the large and small chainring ranges which can be problematic for determining the right combination.

to establish a relationship between the five force components which can exert a motor torque ($P_{Rx}, P_{Ry}, P_{Lx}, L_{Ly}$, Torque) and the five other unknown components of the balance, namely ($R_{Rx}, R_{Ry}, R_{Lx}, R_{Ly}, T_{chain}$). This relationship can be translated into the form of a matrix (5×5) of which the twenty-five coefficients $a_{ij}$, which depend on the angle $\beta$, are calculated by writing the static balance of the six actions previously described. The resolution of the static balance shows that six coefficients are nil and that the coefficients $a_{15}$, $a_{35}$ and $a_{55}$ are independent of $\beta$.

$$\begin{bmatrix} R_{Rx} \\ R_{Ry} \\ R_{Lx} \\ R_{Ly} \\ T_{chain} \end{bmatrix} = \begin{bmatrix} a_{11} & a_{12} & a_{13} & a_{14} & a_{15} \\ 0 & a_{22} & 0 & a_{24} & 0 \\ a_{31} & a_{32} & a_{33} & a_{34} & a_{35} \\ 0 & a_{42} & 0 & a_{44} & 0 \\ a_{51} & a_{52} & a_{53} & a_{54} & a_{55} \end{bmatrix}_\beta \times \begin{bmatrix} P_{Rx} \\ P_{Ry} \\ P_{Lx} \\ P_{Ly} \\ T_{orque} \end{bmatrix} \quad [\text{Math. 6}]$$

The motor torque generated by the power-assistance motor $T_{orque}$ can be known through the measurement of the intensity of the current consumed thereby. It would therefore be theoretically necessary to know at least four independent measurements to be able to determine with certainty the four components of the actions on the right and left pedals ($P_{Rx}, P_{Ry}, P_{Lx}, P_{Ly}$) and completely resolve the system in order to be able to definitely deduce the motor torque.

When the chain is engaged on the large chainring of fifty teeth in accordance with FIG. 1, the coefficients of this matrix, for this example, have the value (Force unit in N and Torque in N·mm).

$$\begin{bmatrix} R_{Rx} \\ R_{Ry} \\ R_{Lx} \\ R_{Ly} \\ T_{chain} \end{bmatrix} = \begin{bmatrix} -2.03 + 1.83.\cos(\beta) & -1.83.\sin(\beta) & 1.05 - 1.83.\cos(\beta) & 1.83.\sin(\beta) & -10.6 \\ 0 & -2.035 & 0 & 1.052 & 0 \\ 1.03 - 0.12.\cos(\beta) & 0.12.\sin(\beta) & -2.05 + 0.12.\cos(\beta) & -0.12.\sin(\beta) & 0.72 \\ 0 & 1.035 & 0 & -2.052 & 0 \\ 1.71.\cos(\beta) & -1.71.\sin(\beta) & -1.71.\cos(\beta) & -1.71.\sin(\beta) & -9.89 \end{bmatrix} \times \begin{bmatrix} P_{Rx} \\ P_{Ry} \\ P_{Lx} \\ P_{Ly} \\ T_{orque} \end{bmatrix} \quad [\text{Math. 7}]$$

A third, more innovative method relies on the analysis of the pedaling cycle of the cyclist. By analyzing the changes of torque generated by a cyclist, it can be noted that the instantaneous torque is a periodic function whose period is paced by the thrust of the right leg then of the left leg. The action of the off-load tension of the chain can advantageously be canceled by making a differential measurement, which consists, on each pedaling cycle, in measuring the minimum value of the reaction and in memorizing it, then subtracting it from each of the instantaneous measurement values giving a differential result which therefore becomes independent of the tension of the chain since it is subtracted upon the subtraction of the minimum value. The absolute value can then be estimated by multiplying the differential value by a proportionality coefficient since the amplitude of the pedaling force is very substantially proportional to the average value of the pedaling force. This differential measurement also makes it possible to cancel the offset variation effect linked to the temperature variations.

Hereinafter in the description, the chain tension $T_o$ will therefore be considered to be negligible and will no longer be considered.

The balance of the forces which are exerted on the crankset schematically represented in FIG. 15 will now be described.

At each angular position of the cranks, represented by the angle $\beta$, the static balance of the crankset makes it possible It is possible here to check that the coefficient a55 is indeed, sign apart: $a_{55} = 2\pi/(N \cdot p)$ It is also possible to confirm that $a_{12} = -a_{14}$ and that $a_{52} = -a_{54}$ and that the ratio $a_{12}/a_{52} = 1.83/1.71 = 1.07$ is constant and independent of $\beta$, so when the pedaling force of the cyclist is purely vertical, the chain tension $T_{Chain}$ is always proportional to the horizontal component $R_{Rx}$, such that the measurement of $R_{Rx}$ in this case makes it possible to easily deduce the chain tension and therefore the transmitted torque.

On the other hand, when the pedaling component is horizontal, there is no longer proportionality between the measurement $R_{Rx}$ and the chain tension $T_{chain}$ because the ratios of the coefficients $a_{11}/a_{51}$, as for $a_{13}/a_{53}$ are no longer independent of $\beta$ and these ratios are even undefined for $\beta = 90°$, so the measurement of $R_{Rx}$ does not make it possible to recalculate the chain tension value.

It can be found that the coefficient $a_{11}$ has an average value of $-2.03$ while the coefficient $a_{12}$ has an average value of 1.05, so a horizontal action on the right pedal $P_{Rx}$ provokes a reaction at the bearing $R_{Rx}$ that is much lower than on the left pedal $P_{Lx}$ (when the crankset will have rotated by 180°) such that the measurement of the component $R_{Rx}$ favors a horizontal action on the left pedal whereas it disadvantages almost two times more (2.03/1.05=1.93) the action on the right pedal.

One of the objectives of the invention is to provide a solution that makes it possible to easily determine the average torque transmitted by the cyclist from the measurement of the radial component $R_{Rx}$ measured on the bearing placed on the side of the crankset which is highly stressed by the chain tension.

Hereinafter in the description with reference to FIGS. 17, 18, 19 and 20, attention will be focused exclusively on the forces linked to the pedaling of the cyclist, without therefore considering the power-assistance torque, the "Torque" component cited in the matrix calculation above then being considered nil.

The pedaling cycle of a cyclist is known in the scientific literature, the doctor Frédéric Grappe published several documents on the analysis of pedaling in cycling and the following description is based on the pedaling force measurements detailed in his work "Cycling and performance optimization" (2nd edition/Editions De Boeck Université 2009), and particularly in chapter 8 "Pedaling biomechanics".

The action of the right and left pedals are very similar and phase-shifted by 180°. FIG. 17 presents the trend as a function of the angle β, of the two force components generated by the right pedal $P_{Rx}$ (horizontal) and $P_{Rv}$ (vertical), and the resultant torque $M_{Rz}$ generated about the axis of the crankset. It can be noted that, for an angle β of between 190° and 360°, the torque is negative and therefore slightly resisting.

The analysis of the pedaling of a cyclist shows that the action of the right and left pedals are very similar and phase-shifted by 180°.

FIG. 18 represents the trend as a function of β of the torque of the right pedal ($M_{Rz}$) already represented in FIG. 17 and of the left pedal ($M_{Lz}$) which is substantially a simple phase-shift by a half-revolution, as well as the sum thereof which represents the total torque ($M_{total}$) and, finally, the average pedaling torque ($M_{avg}$) which here is 41 N·m. It can be noted that the total torque is a function, of sinusoidal appearance and always positive, whose period is half the pedaling period.

The appearance of the four force components ($P_{Rx}, P_{Ry}, P_{Lx}, P_{Ly}$) derived from FIG. 17, represents four periodic signals phase-shifted by a half-period between right and left. That is why, it is not necessarily necessary to perform four measurements to accurately evaluate the average torque transmitted by the chain.

When seeking to determine the forces generated on the bearings by the application of these pedaling forces, it is sufficient to apply the above matrix to the input values ($P_{Rx}, P_{Ry}, P_{Lx}, P_{Ly}$) as a function of β.

In the first embodiment of the invention, because of the positioning of the gauges (see FIG. 13), the signal supplied by the sensor is essentially representative of the component of the reaction $R_{right}$ in the direction X', that is to say the direction at right angles to the diagonal Y' which links the two frames 33, 33'. The angular position of the sensor 3, identified by the angle φ in FIG. 3, therefore has an influence on the amplitude and the variations of the signal supplied by the sensor during a complete cycle. This rotation of angle φ means that the measurement $R_{RX}'$ can be calculated easily from $R_{RX}$, $R_{RY}$ derived from the preceding matrix calculation:

$$R_{RX}'=R_{RX}\cos\varphi'+R_{RY}\sin\varphi' \quad \text{[Math. 8]}$$

FIG. 19 shows the variations of force measured as a function of the angle β, for a chainring of fifty teeth in accordance with FIG. 1, and the different values of the angle φ of between 0° and 30°. When φ is nil, that is to say that the axis Y' coincides with the axis Y, the force measured by the sensor is represented by the curve $R_{RX}0°$, represented by a solid line in the graph of FIG. 19, passes through a zero value and becomes negative in the phase 100°<β<165°, which already poses a problem in processing the signal since the sign and the direction of variation are opposite to the rest of the course of β but the result thereof is also that the average value of the signal measured during the descent of the right pedal (0°<β<180°) will be less than the average value of the signal during the descent of the left pedal (180°<β<360°). This is illustrated in FIG. 19 by the representation of the signed areas $A_1$, and $A_2$, which are, respectively, the areas under the curve $R_{RX}0°$, of the signal in the phases 0°<β<180° and 180°<β<360°. The area $A_1$ represents the image through the measurement $R_{Rx}$ of the work of the torque transmitted by the right pedal whereas the area $A_2$ represents the image of the work of the left pedal. In order for the images of the work, and therefore of the contribution of each of the two right and left legs, to be well representative of the actual work, it would be necessary for $A_1=A_2$, i.e. $A_1/(A_1+A_2)=0.5$ (=50%). It can also be seen that the maximum signal of the first phase 0°<β<180° is obtained for β=85° and that it is significantly lower than the maximum signal of the second phase 180°<β<360° which is obtained for β=280° which also contributes to the imbalance of the areas $A_1$ and $A_2$.

The graph of FIG. 19 also comprises three other curves represented by dotted lines, which represent the signal measured by inclining the sensor 3 successively by an angle φ of 10°, 23° and 30°, and it can be seen that, when the angle φ increases, the maximum of the first phase increases whereas the maximum of the second phase decreases and that as soon as φ>10°, the signal no longer becomes negative which makes it possible to simplify the processing thereof. Increasing the angle φ therefore tends to increase the area $A_1$ and reduce the area $A_2$ and therefore to balance and increase the ratio $A_1/(A_1+A_2)$.

Of course, the measured signal and its trend are also dependent on the transmission ratio of the chain (different matrix coefficients). The measurements of FIG. 19 are made for a transmission ratio 50/11, that is to say a chainring that has fifty teeth and a rear sprocket with eleven teeth. Another transmission ratio gives slightly different signal curves.

The graph of FIG. 20 represents simply the variation of the ratio $A_1/(A_1+A_2)$ as a function of the angle φ varying between 0° and 35° for two different transmission ratios, 50/11 and 34/26.

It can be seen that, for these two transmission ratios, the angle φ=23° corresponds to the angle for which the ratio $A_1/(A_1+A_2)$ is equal to 50% and that this optimum is independent of the chainring used.

The average torque transmitted by the cyclist on each pedaling cycle is therefore clearly proportional to the area $A_1+A_2$, the proportionality coefficient being dependent on the number of teeth of the chainring used and being able to be established by a prior calibration in a laboratory.

It can be noted that the dissymmetry of right/left measurement is essential due to the two horizontal components of the pedaling, but it can be noted that the lower limbs of the cyclist are composed of the femur, the knee, the tibia, the ankle and the sole of the foot to end with the pivot link of the axis of the pedal, and all of this mechanical system can be compared to a mechanical knee-joint system between the hip joint and the axis of the pedal which generates an average thrust force passing through the axis of the pedal and close to the axis of the femur, generally inclined by some twenty degrees with respect to the vertical when the pedal is in its truly motive phase (right pedal 30°<β<150°), so it can therefore be understood that, when the sensor is oriented substantially at right angles to this pedal axis/femur axis line, it becomes symmetrical because it is not disturbed by a right-angled component that has become negligible.

It can be deduced from this observation that, if it is desired to adapt the invention to a particular bicycle type, such as for example a recumbent bicycle, it would be appropriate to look at the inclination of the plane passing through the axis of the pedal and the axis of the femur and compare it to the reference frame of the chain which, in this example, is substantially horizontal, and adapt the angle of inclination φ of the sensor in order to best symmetrize $A_1$ and $A_2$, it being better to perform instrumented tests in a laboratory beforehand to find an appropriate value of φ.

On a traditional bicycle, when the cyclist starts pedaling in the so-called dancer position, the horizontal component tends to disappear and the angle φ can then be reduced to 10° or 15° so as not to excessively refavor the right leg, as for practicing triathlon cycling it is standard practice to advance the seat which also results in reducing the horizontal component, the angle φ must therefore in practice be between 10° and 30°.

Although, in the above paragraphs, we have deliberately not taken into consideration the superimposition of an assistance torque in order to focus on the forces generated by the cyclist, we will now reconsider the superimposition of an assistance torque which will modify the signal measured by the sensor 3.

Preferably, the control of the motor torque delivered by the power-assistance motor is done in such a way that the latter is proportional to the average torque delivered by the cyclist, the power-assistance coefficient $K_4$ can be selected by the cyclist who will for example be able to choose between three assistance modes (Low/Medium/High), each corresponding to a different coefficient, so it will for example be possible to program $K_{4.Low}=30\%$, $K_{4.Medium}=75\%$ and $K_{4.High}=120\%$.

In order to minimize the noise and optimize the efficiency of the power-assistance motor and therefore the autonomy of the system, the tests show that it is preferable for the motor to deliver a power-assistance torque that is the most constant possible rather than follow the instantaneous trend of the torque of the cyclist C, so it is therefore desirable to average the measurement closer to the trend of the average torque of the cyclist without too much introducing delay in the calculation of the average.

FIG. 21 is a block diagram explaining the servocontrol principle of the device for measuring force and controlling the motor according to the invention.

It is important to provide a safety device which will not be described here, that makes it possible to abruptly stop the torque delivered by the motor as soon as the safety of the user might be affected, by considering, for example, sudden stopping phases, back-pedaling or braking, and this device is denoted "Stop Assist" because it will make it possible to order the control of the motor to stop suddenly.

The box "$I_t$(Amp)" symbolizes the controller which will drive the motor current-wise to control its torque according to an intensity setpoint $I_t$, this current $I_t$ will generate a torque $C_{mot}=K_1 \cdot I$, $K_1$ being the torque constant of the gear motor which will be able to be determined and programmed in the factory and entered into memory (symbolized by the box $K_1$). With a brushless motor technology that is particularly suited to electrical power-assistance cycles, the controller will have to recalculate the current injected in each of the phases with a very high frequency, and our torque setpoint calculation loop will therefore also be able to be potentially recalculated at a high frequency.

This torque $C_{mot}$ generated by the motor will induce a force component $R_{RX}\text{'assist}=K_2 \cdot C_{mot}=K_1 \cdot K_2 \cdot I$, the factor $K_2$ (symbolized by the box "$K_2$") being a function of the number of teeth of the meshed chainring (symbolized by the box $N_t$), and therefore proportional to the coefficient a15 of the matrix and to cos φ (φ designating the inclination of the sensor), and the product $K_1 \cdot K_2$ can also be determined by the microcontroller in a prior calibration operation. This prior calibration operation will, for example, be able to be done using the following protocol: the rear brake is blocked in order to immobilize the rotation of the rear wheel, at the same time a current setpoint is sent to the motor and the change to the signal from the sensor 3 which will result from the tensioning of the chain under the effect of the motor is measured, so the microcontroller will then be able to memorize the product $K_1 \cdot K_2$. As for the number of teeth of the chainring used, the latter will be able to be obtained by any known means, notably by a monitoring of the position of the front derailleur, such monitoring being relatively easy with electric derailleur systems.

The sensor 3 represented by the Wheatstone bridge will be stressed by three mechanical actions symbolized in the block diagram by dotted-line arrows, so the action of the motor torque of the power-assistance motor is therefore found which is superimposed on the motive action of the cyclist (symbolized by the "Cyclist" box) to transmit the sum of these torques to the action of the chain (symbolized by the "Chain" box) which will transmit the motor force to the rear wheel (symbolized by the "Rear Wheel" circle).

The signal S generated by the sensor 3, $R_{Rx}$'Total will therefore be the superimposition of the value generated by the motor, the value generated by the cyclist that was described in the preceding paragraphs and of the value linked to the off-load tension To of the chain that was also described previously.

A microcontroller subtracts, from the measurement $R_{RX}$'Total derived from the sensor 3, the component derived from the power-assistance motor $R_{RX}$'assist calculated from the motor current, and the result obtained is therefore what is indicated in the corresponding box: $R_{RX}\text{'Cyclist}=R_{RX}\text{'Total}-R_{RX}\text{'assist}$; that is to say also: $R_{RX}\text{'Cyclist}=R_{RX}\text{'Total}-K_1 \cdot K_2 \cdot I$.

Figure 22:
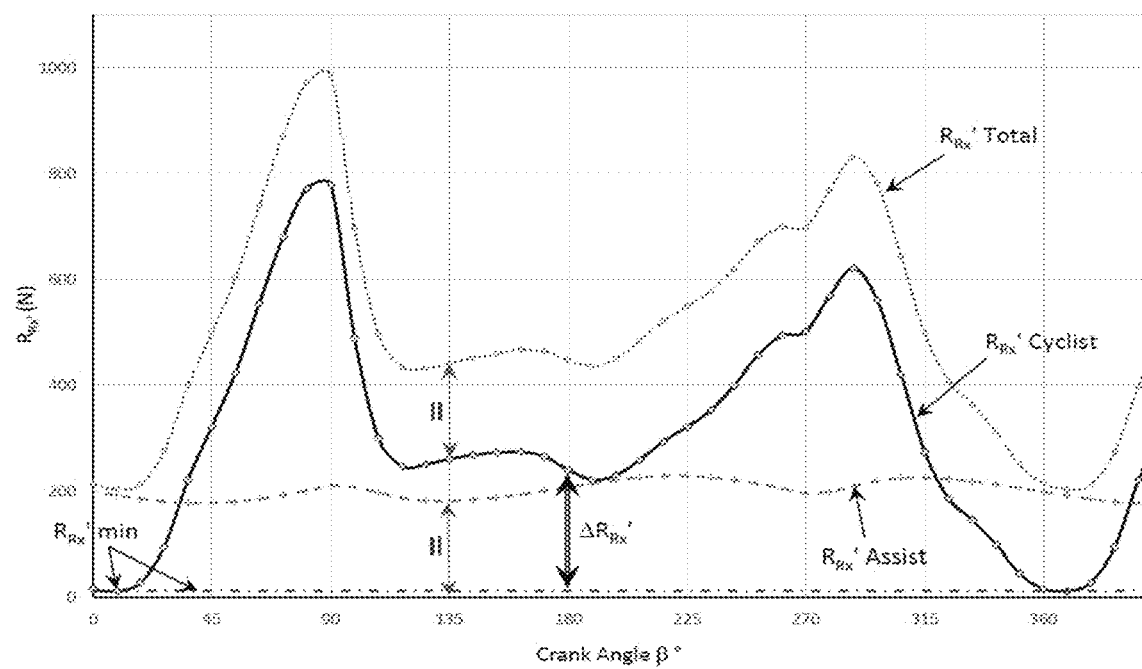
FIG. 22 is a graph representing the variation of the horizontal components which are exerted on the sensor.

FIG. 22 is a graph illustrating this operation, a first, top dotted-line curve represents the measurement of the force $R_{RX}$'Total determined by the sensor 3, a second, median dotted-line curve represents the component $R_{RX}$'Assist calculated using the instantaneous measurement of the motor current multiplied by the coefficients $K_1$ and $K_2$, a third, bold continuous line curve represents the value $R_{RX}$'Cyclist which is obtained by subtracting the second curve from the first, a subtraction which is schematically represented by the two arrows of equal length at β=135°.

It should be noted that, at this stage, the component induced by the off-load tension of the chain To is clearly still superimposed and therefore influential in the measurement.

In order to cancel this component linked to the off-load tension of the chain $T_o$ and also render the measurement independent of the potential offset variations linked to the temperature variations, there will then be a differential measurement measuring the amplitude of variation $\Delta R_{Rx}'$ of the force $R_{Rx}$'Cyclist previously obtained, and for that, as represented in the block diagram of FIG. 21, an algorithm (symbolized by the box $R_{Rx}$'min) monitors the trend of the value $R_{Rx}$'Cyclist and determines, on each revolution, preferably, in the vicinity of β=0°, the minimum value of $R_{Rx}$'Cyclist and temporarily stores it in memory. On each revolution, a new minimum value will replace the preceding minimum value in the memory.

The value $R_{Rx}$' min can be visualized by the horizontal bottom dotted-line curve of the graph of FIG. 22.

This value RRx' min will then be subtracted from the value $R_{Rx}$' Cyclist previously obtained to obtain, as in the corresponding box: $\Delta R_{Rx}$'Cyclist=$R_{Rx}$'Cyclist–$R_{Rx}$'min.

This value is represented in FIG. 22 by a double arrow $\Delta R_{Rx}$' for β=180°, it is regenerated on each calculation loop, it varies significantly and cyclically with the pedaling of the cyclist, but, in order to optimize the efficiency of the motor and also its emitted noise level, it is preferable to average and smooth its torque setpoint by taking care not to excessively degrade the response time of the system, which is why the block diagram of FIG. 21 provides an averaging operation performed preferentially over a multiple of half-revolutions of the crankset which is highly effective in terms of smoothing since it corresponds exactly to the period of the excitation signal due to the pedaling cycle and this operation is denoted:

$$\overline{DR_{Rx'Cyclist}}(\beta) = \frac{2}{n}\sum_{i=1}^{i=n/2} DR_{Rx'Cyclist}{\left(\beta - \frac{2\pi i}{n}\right)} \quad [\text{Math. 9}]$$

where n represents the number of sampling values averaged per revolution, for example forty samples every 9° as can be seen by each of the visible dots on the curves of FIG. 22, so the above calculation therefore produces a simple arithmetic average of the twenty preceding values of the differential value $\Delta R_{Rx}$'cyclist which gives a highly reactive and very stable smoothing.

In the example of FIG. 22, it can be noted that the determination of $R_{Rx}$'Assist is derived from a complete model in which the power-assistance factor $K_4$ is 75% and or the average torque delivered by the cyclist is stable and is 25 N·m, the above complete algorithm generates a small oscillation of this value around its average value but which remains very low relative to the oscillation of the torque of the cyclist.

The stability of the average can be significantly enhanced by producing the average over n values of a complete revolution, i.e. the forty preceding values in the above example, the response time on the other hand will be twice as long, this mode can be adopted for example in a so-called "soft" or "eco" power-assistance mode to maximize the efficiency of the motor and minimize the noise, in this case the motor torque oscillation then becomes imperceptible.

This average can also be calculated as a function of time and not angle by sampling at a fixed frequency and by continuously calculating the arithmetic average of the values recorded over the preceding half-revolution or revolution, but it will however be able to be noted that the theoretical definition of the elementary work is $\delta W=C \cdot d\beta$ or $\delta W=P \cdot dt=C \cdot \Omega \cdot dt=C \cdot (d\beta/dt) \cdot dt$, in other words, the calculation of the arithmetic average done as a function of time is exact from an energy point of view only if the speed of rotation is constant, it should ideally be weighted by the speed of rotation, but the speed variation over a crankset revolution is not very significant (except when riding standing on the pedals) and the approximation can be tolerated if the accuracy of the average sought and therefore of the power-assistance ratio $K_4$ is not too demanding.

The average differential value $$\overline{\Delta R_{Rx'}}(\beta)$$

is proportional to the average torque developed by the cyclist, so it is therefore sufficient to multiply it by the coefficient K3 (symbolized by the box "K3" in FIG. 21) to obtain the average torque of the cyclist according to the operation denoted:

$$\overline{C}_{cyclist(\beta)} = K_3 \cdot \overline{\Delta R_{Rx'}}(\beta) \quad [\text{Math. 10}]$$

The factor $K_3$ which depends primarily on the number of teeth of the chainring 18, is a coefficient expressed as a unit of length which is a little smaller than the primitive radius of the chainring, in the example represented in FIG. 1 with a chainring of fifty teeth (primitive radius of 101 mm), the value $K_3$ obtained in this example is 80.1 mm (79% of $R_{primitive}$), this value taking account of the many parameters such as the angle of the sensor φ, the attenuation (−4%) linked to the differential calculation and which can depend slightly on the force diagram of the cyclist.

This coefficient $K_3$ can be determined advantageously by a prior calibration in the laboratory with typical cyclists. A bicycle equipped with a system without power-assistance is positioned on an ergometer having a braked and instrumented rear wheel making it possible to determine the average torque exerted on the crankset by the cyclist from whom a typical pedaling force is demanded. The signal $R_{Rx'}$ from the sensor is recorded and processed by the differential measurement and arithmetic averaging algorithm, and it is then sufficient to calculate the ratio between these two values to obtain $K_3$, taking care to calculate it for each chainring used.

This coefficient $K_3$ is entered into memory for each chainring value used in order for the microcontroller to be able to select the right coefficient as a function of the chainring used.

After having determined the averaged cyclist torque $\overline{C}_{cyclist(\beta)}$ and knowing the level of power assistance $K_4$ selected by the user, it is then possible to calculate what should be the new torque setpoint of the motor:

$$C_{mot}=K_4 \cdot \overline{C}_{cyclist(\beta)} \quad [\text{Math. 11}]$$

And therefore deduce the new setpoint of intensity which has to be injected by the controller at the motor:

$$I_{t+\varepsilon} = \frac{K_4}{K_1}\overline{C}_{cyclist(\beta,t)} \quad [\text{Math. 12}]$$

This assistance torque control cycle can be regenerated for example at a rate of at least 10 to 100 times per revolution. If it is managed as a function of time, it is desirable for the regeneration frequency to be sufficient notably when the pedaling rate is high in order for it to continue to correctly follow the rapid changes of the cyclist.

The sensor according to the invention has been described in the particular context of measuring torque developed by a cyclist pedaling on a bicycle with electric power assistance. It will easily be understood that this use is not the only one which can be made of this sensor.

First of all, it will be possible to use this sensor to measure torque developed by the cyclist in the context of a normal bicycle, that is to say without electric power assistance. The angular positioning of the sensor will be identical to what has been described above. The operation of the sensor and of the Wheatstone bridge will also be identical. Only the processing of the signal measured by the Wheatstone bridge to culminate in the calculation of the motor torque of the cyclist will differ inasmuch as it will no longer be necessary to subtract the torque supplied by the motor.

It will also be possible to use this same sensor to measure force to which any rotating shaft is subjected.

Also, it will be possible to envisage using several identical sensors for the same rotary assembly. For example, a bicycle crankset assembly will be able to include a sensor according to the invention around each of the bearings of the bottom bracket shell.

The invention claimed is:

1. A crankset assembly configured to be mounted on a bicycle, said assembly comprising:
    at least one right-hand bearing for mounting a crankset spindle and a single force sensor placed around an outer ring of said bearing, said force sensor comprising a peripheral portion, a central portion and a top frame linking a top section of the peripheral portion to a top portion of the central portion, said top frame being placed on a diameter oriented on an axis (Y'),
    wherein the axis (Y') forms an angle ($\varphi$) of between 10° and 30° with a vertical axis (Y) in a counter clockwise direction when seen from a right side of the bicycle so that the top frame is oriented towards a rear side of the bicycle with respect to the vertical axis (Y).

2. The assembly as claimed in claim 1, wherein the angle ($\varphi$) is between 20° and 25°.

3. The assembly as claimed in claim 1, wherein the sensor is equipped with a single measuring channel.

4. The assembly as claimed in claim 1, wherein four strain gauges are placed on the top frame, said four strain gauges being mounted in Wheatstone bridge configuration in order to supply a signal to the single measuring channel.

5. The assembly as claimed in claim 1, wherein said central portion comprises a seat configured to receive an outer ring of a bearing in order to mount a shaft rotating about an axis.

6. The assembly as claimed in claim 1, wherein the top frame comprises a web plate bracketed by two arms that are substantially parallel to one another such that said top section of the peripheral portion, said top portion of the central portion, and the two arms form a parallelogram.

7. The assembly as claimed in claim 6, wherein a thickness of the web plate, on an axis (Z), is less than 50% of a thickness of the arms.

8. The assembly as claimed in claim 6, wherein the web plate is in contact with the two arms, with the top section, and with the top portion.

9. The assembly as claimed in claim 6, wherein the web plate, the two arms, the top section, and the top portion form part of one and a same piece produced in a single material.

10. The assembly as claimed in claim 6, wherein the web plate is planar and is oriented on a radial plane, at right angles to an axis (Z).

11. The assembly as claimed in claim 6, wherein, on an axis (Z), the web plate occupies a central position with respect to the arms.

12. The assembly as claimed in claim 1, wherein a bottom frame, which is substantially identical to the top frame, links the peripheral portion to the central portion, and the top frame and the bottom frame are diametrically opposed.

13. The assembly as claimed in claim 1, wherein a bottom frame, which is substantially identical to the top frame, links the peripheral portion to the central portion, and the top frame and the bottom frame are diametrically opposed along the axis (Y').

14. A method for controlling an electric assist motor for a bicycle, comprising:
    equipping said bicycle with the crankset assembly as claimed in claim 1, wherein a signal S generated by the force sensor corresponds to the component, on an axis (X', X'), that is at right angles to (Y') and to (Z), of the action $R_{right}$ being exerted on the right-hand bearing, the component being denoted: $R_{Rx}$Total, and
    wherein the part of the component $R_{Rx}$Total, which is generated by a cyclist, $R_{Rx}$Cyclist, is equal to:

$$R_{Rx}\text{Cyclist} = R_{Rx}\text{Total} - K_1 * K_2 * I$$

in which, I is the current consumed by the assist motor; $K_1$ is a constancy of torque of the assist motor and $K_2$ is a factor dependent on a number of teeth of a chain ring meshing with a transmission chain, and wherein the current supplied to the electric assist motor is determined according to an action of the cyclist $R_{Rx}$Cyclist deduced from the signal S.

* * * * *